(12) United States Patent
Kato et al.

(10) Patent No.: US 8,405,918 B2
(45) Date of Patent: Mar. 26, 2013

(54) ZOOM LENS AND IMAGING APPARATUS

(75) Inventors: Takuya Kato, Tokyo (JP); Atsushi Ohata, Tokyo (JP)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 13/067,659

(22) Filed: Jun. 17, 2011

(65) Prior Publication Data
US 2012/0044577 A1 Feb. 23, 2012

(30) Foreign Application Priority Data

Aug. 20, 2010 (JP) .................. 2010-185220

(51) Int. Cl.
*G02B 15/14* (2006.01)
(52) U.S. Cl. ....................................... 359/689
(58) Field of Classification Search .................... 359/689
See application file for complete search history.

(56) References Cited

U.S. PATENT DOCUMENTS
2009/0091843 A1* 4/2009 Ohata ........................ 359/689

FOREIGN PATENT DOCUMENTS
| JP | 2000-267009 | 9/2000 |
| JP | 2008-233871 | 10/2008 |
| JP | 2009-251568 | 10/2009 |

* cited by examiner

*Primary Examiner* — William Choi
(74) *Attorney, Agent, or Firm* — Rader, Fishman & Grauer PLLC

(57) ABSTRACT

The present disclosure provides a zoom lens, wherein a first lens group having a negative refractive power, a second lens group having a positive refractive power, and a third lens group having the positive refractive power are disposed from an object side to an image side in order; and when a zooming state is changed from a wide angle end state to a telescopic end state, at least the first lens group and the second lens group are movable.

5 Claims, 13 Drawing Sheets

TELESCOPIC END

SPHERICAL ABERRATION

CURVATURE OF FIELD

DISTORTION ABERRATION

WIDE ANGLE END

SPHERICAL ABERRATION

CURVATURE OF FIELD

DISTORTION ABERRATION

WIDE ANGLE END

SPHERICAL ABERRATION

CURVATURE OF FIELD

DISTORTION ABERRATION

TELESCOPIC END

SPHERICAL ABERRATION

CURVATURE OF FIELD

DISTORTION ABERRATION

ZOOM LENS AND IMAGING APPARATUS

BACKGROUND

The present disclosure relates to a zoom lens and an imaging apparatus. More particularly, the disclosure relates to a zoom lens which is used in a video camera, a digital still camera or the like, thereby realizing miniaturization, high image quality promotion, and high magnification promotion, and an imaging apparatus using the same.

In recent years, a digital camera using an imaging element such as a Charge Coupled Device (CCD) or a Complementary Metal Oxide Semiconductor (CMOS) instead of using a silver salt film has rapidly come to be widely used.

In such a manner, along with the popularization of the digital camera, in particular, the needs of users for low cost promotion, miniaturization, and high magnification promotion of a lens integrated digital camera have been increased. In addition, the number of pixels in the imaging element has a tendency to be increased year by year. Also, the needs of the users for high image quality promotion have also been increased.

For the purpose of promoting the low cost and high image quality described above, an optical system is proposed in which three lens group construction having a negative refractive power, a positive refractive power, and a positive refractive power (negative, positive and positive) are adopted, and plastic lenses are disposed in the three lens groups, respectively. Such optical systems, for example, are described in Japanese Patent Laid-Open Nos. 2000-267009, 2008-233871 and 2009-251568, (hereinafter referred to as Patent Documents 1, 2 and 3, respectively).

SUMMARY

In each of the optical systems described in Patent Documents 1 and 2, an optical total length on a wide angle side is long for a size and a variable magnification ratio of the imaging element. Thus, the sufficient high magnification promotion and miniaturization are not yet realized.

In addition, in the optical system described in Patent Document 3, there is adopted a construction such that the plastic lens whose performance is largely deteriorated due to a temperature change and a humidity change has a strong reflective power. Therefore, there is adopted the disposition of the refractive power in which it is difficult to realize the high magnification promotion with preservation of the high image quality promotion and the miniaturization.

The present disclosure has been made in order to solve the problems described above, and it is therefore desirable to provide a zoom lens and an imaging apparatus in each of which miniaturization, high image quality promotion, and high magnification promotion are realized with realization of reduction in manufacturing cost.

In order to attain the desire described above, according to an embodiment of the present disclosure, there is provided a zoom lens, in which a first lens group having a negative refractive power, a second lens group having a positive refractive power, and a third lens group having the positive refractive power are disposed from an object side to an image side in order; when a zooming state is changed from a wide angle end state to a telescopic end state, at least the first lens group and the second lens group are movable; the first lens group is constructed in such a way that a glass lens having the negative refractive power and a plastic lens having the positive refractive power are disposed from the object side to the image side in order; the second lens group is constructed in such a way that a cemented lens composed of a glass lens having the positive refractive power and located on the object side, and a glass lens having the negative refractive power and located on the image side, and a plastic lens having the negative refractive power are disposed from the object side to the image side in order; the third lens group has at least one plastic lens having the positive refractive power; and conditional expressions (1), (2) and (3) are fulfilled:

$$Lw/(fw0 \tan \omega w) < 9.0 \quad (1)$$

$$|f2/(fw0ft)^{1/2}| < 1.0 \quad (2)$$

$$1.2 < |f1/(fw0ft)^{1/2}| < 1.4 \quad (3)$$

where Lw is an optical total length in a wide angle end, fw is a focal length of a lens entire system in the wide angle end, ωw is a half field angle in the wide angle end, f2 is a focal length of the second lens group, ft is a focal length of the lens entire system in a telescopic end, and f1 is a focal length of the first lens group.

Therefore, in the zoom lens, the total length is shortened, and the optical performance is enhanced by appropriating the refractive power.

In the zoom lens described above, conditional expressions (4) and (5) are preferably fulfilled:

$$|fP1/f1| > 2.1 \quad (4)$$

$$|fP2/f2| > 4.0 \quad (5)$$

where fP1 is a focal length of the plastic lens having the positive refractive power of the first lens group, and fP2 is a focal length of the plastic lens having the negative refractive power of the second lens group.

The zoom lens fulfills the conditional expressions (4) and (5), thereby appropriating the refractive powers of the plastic lenses of the first lens group and the second lens group.

In the zoom lens described above, a conditional expression (6) is preferably fulfilled:

$$0.9 - Lw/Lt \leq 1.05 \quad (6)$$

where Lt is an optical total length in a telescopic end.

The zoom lens fulfills the conditional expression (6), thereby shortening the optical total length.

In the zoom lens described above, conditional expression (7) and (8) are preferably fulfilled:

$$1.55 \leq n1 \leq 1.7 \quad (7)$$

$$v1 > 60 \quad (8)$$

where n1 is a refractive index of the glass lens having the negative refractive power of the first lens group, and v1 is an Abbe's number of the glass lens having the negative refractive power of the first lens group.

The zoom lens fulfills the conditional expressions (7) and (8), whereby the refractive index of the glass lens in the first lens group is appropriated, and generation of a chromatic aberration is suppressed.

According to another embodiment of the present disclosure, there is provided an imaging apparatus including: a zoom lens; and an imaging element converting an optical image formed by the zoom lens into an electrical signal, in which the zoom lens is constructed in such a way that: a first lens group having a negative refractive power, a second lens group having a positive refractive power, and a third lens group having the positive refractive power are disposed from an object side to an image side in order; when a zooming state is changed from a wide angle end state to a telescopic end state, at least the first lens group and the second lens group are movable; the first lens group is constructed in such a way that a glass lens having the negative refractive power and a plastic lens having the positive refractive power are disposed from the object side to the image side in order; the second lens group is constructed in such a way that a cemented lens composed of a glass lens having the positive refractive power and located on the object side, and a glass lens having the negative refractive power and located on the image side, and a plastic lens having the negative refractive power are disposed from the object side to the image side in order; the third lens group has at least one plastic lens having the positive refractive power; and conditional expressions (1), (2) and (3) are fulfilled:

$$Lw/(fw0 \tan \omega w) < 9.0 \quad (1)$$

$$|f2/(fw0ft)^{1/2}| < 1.0 \quad (2)$$

$$1.2 < |f1/(fw0ft)^{1/2}| < 1.4 \quad (3)$$

where Lw is an optical total length in a wide angle end, fw is a focal length of a lens entire system in the wide angle end, ωw is a half field angle in the wide angle end, f2 is a focal length of the second lens group, ft is a focal length of the lens entire system in a telescopic end, and f1 is a focal length of the first lens group.

Therefore, in the imaging apparatus, the total length in the zoom lens is shortened, and the optical performance is enhanced by appropriating the refractive power.

As set forth hereinabove, according to the present disclosure, in the zoom lens and the imaging apparatus, after reduction of the manufacturing cost, the miniaturization, the high image quality promotion, and the high magnification promotion can be realized.

DETAILED DESCRIPTION OF THE PREFERRED EMBODIMENTS

Figure 1:
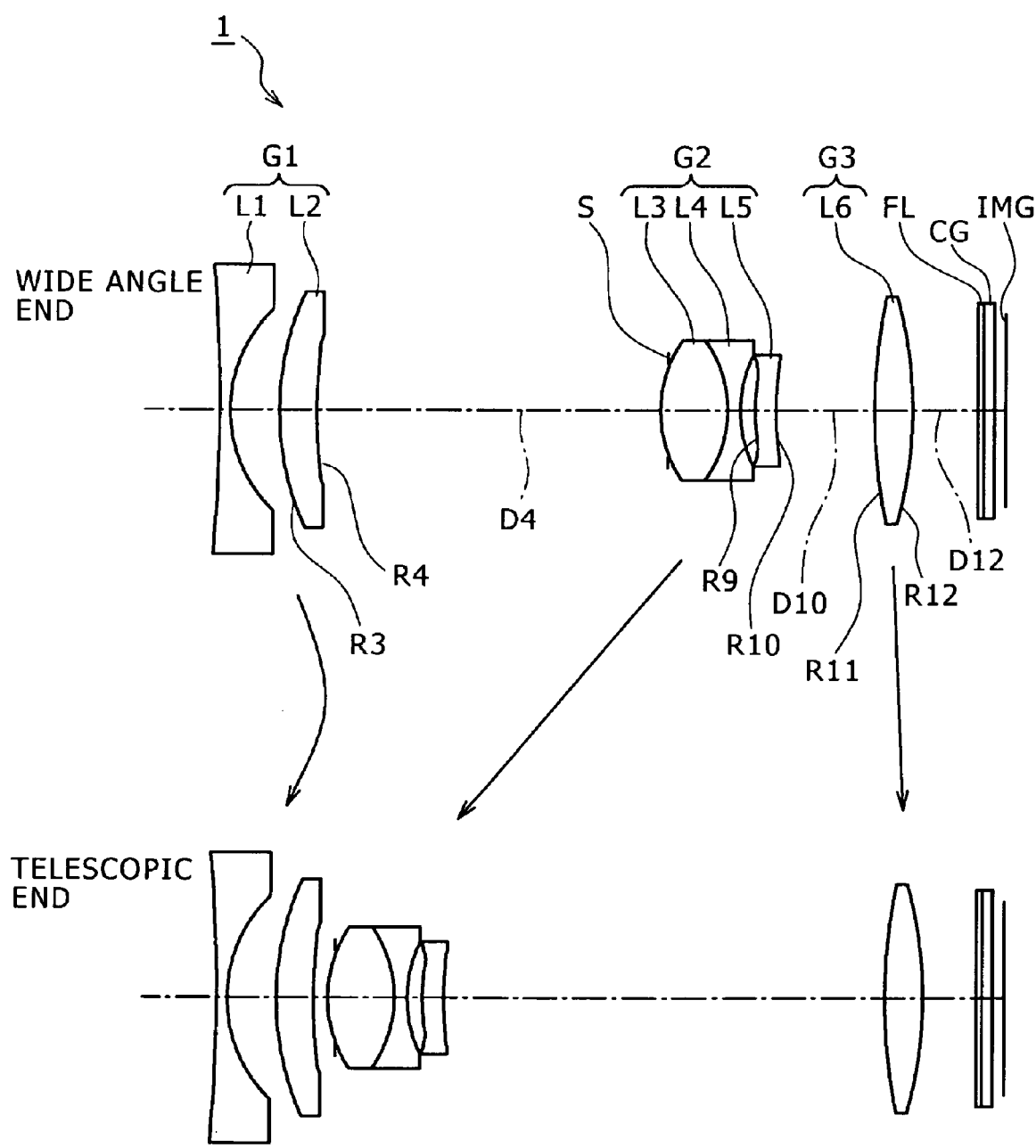
FIG. 1 is a view showing a lens construction of a zoom lens according to a first embodiment of the present disclosure.

A zoom lens and an imaging apparatus according to embodiments of the present disclosure will be described in detail hereinafter with reference to the accompanying drawings.

Construction of Zoom Lens

The zoom lens of the present disclosure is constructed in such a way that a first lens group having a negative refractive power, a second lens group having a positive refractive power, and a third lens group having the positive refractive power are disposed from an object side to an image side in order. Also, when a zooming state is changed from a wide angle end state to a telescopic, end state, at least the first lens group and the second lens group are movable.

In addition, in the zoom lens of the present disclosure, the first lens group is constructed in such a way that a glass lens having the negative refractive power, and a plastic lens having the positive refractive power are disposed from the object side to the image side in order. The second lens group is constructed in such a way that a cemented lens composed of a glass lens having the positive refractive power and located on the object side, and a glass lens having the negative refractive power and located on the image side, and a plastic lens having the negative refractive power are disposed from the object side to the image side in order. Also, the third lens group has at least one plastic lens having the positive refractive power.

In addition, the zoom lens of the present disclosure fulfills conditional expressions (1), (2) and (3):

$$Lw/(fw0 \tan \omega w) < 9.0 \quad (1)$$

$$|f2/(fw0ft)^{1/2}| < 1.0 \quad (2)$$

$$1.2 < |f1/(fw0ft)^{1/2}| < 1.4 \quad (3)$$

where Lw is an optical total length in a wide angle end, fw is a focal length of a lens entire system in the wide angle end, ωw is a half field angle in the wide angle end, f2 is a focal length of the second lens group, ft is a focal length of the lens entire system in a telescopic end, and f1 is a focal length of the first lens group.

As described above, in the zoom lens of the present disclosure, in the three lens groups construction having the negative refractive power, the positive refractive power, and the positive refractive power (negative, positive and positive), the plastic lenses are used in the lens groups, respectively, thereby making it possible to reduce the manufacturing cost.

In addition, the first lens group is composed of two sheets of lenses. Also, a glass lens is used as a negative lens on the object side, and a plastic lens is used as a positive lens on the image side, whereby in general, the plastic lens having the small refractive index can be effectively disposed in the first lens group having the negative refractive power as a whole. That is to say, using the plastic lens as the positive lens of the first lens group results in that the refractive power of the plastic lens can be suppressed and also the performance deterioration when a temperature change or a humidity change is generated can be suppressed as compared with the case where the plastic lens is used as the negative lens.

In addition, no plastic lens is used as the negative lens on the object side of the first lens group, and the plastic lens is used as the positive lens, whereby an outside diameter of the plastic lens can be reduced, and the securement of the strength of the lens, and the enhancement of the moldability can be realized.

Moreover, the plastic lens of the first lens group is constructed in the form of the positive lens, and the negative lens of the second lens group is constructed in the form of the plastic lens. Therefore, a fluctuation in back focus when the temperature change or the humidity change is generated can be cancelled by a fluctuation in back focus of the plastic lens of the second lens group for a fluctuation in back focus of the plastic lens of the first lens group. As a result, the enhancement of the optical performance can be realized.

In addition thereto, in general, when the number of constructional sheets of the first lens group is reduced in order to realize the miniaturization, the lens of the first lens group needs to be constructed in the form of an aspherical lens in order to suppress the generation of the aberration. However, in the zoom lens of the present disclosure, the plastic lens is used as the lens of the first lens group, and the plastic lens is constructed in the form of an aspherical lens. Therefore, it is unnecessary to form an aspherical surface in the glass lens. Thus, after securement of the reduction in manufacturing cost, the miniaturization and the securement of the excellent aberration correcting function can be realized.

As described above, the zoom lens of the present disclosure adopts the construction such that after the reduction in manufacturing cost is realized by using the plastic lenses in the first to third lens groups, respectively, the conditional expressions (1), (2) and (3) are fulfilled as will be described below, thereby realizing the miniaturization, the high image quality promotion, and the high magnification promotion.

The conditional expression (1) is an expression for regulating a relationship between the optical entire length in the wide angle end, and the focal length and field angle of the lens entire system in the wide angle end.

When the upper limit of the conditional expression (1) is exceeded, even though it is possible to realize the high magnification promotion, the total length of the zoom lens becomes too long to cause the increased scale.

Therefore, the zoom lens fulfills the conditional expression (1), thereby making it possible to realize the high magnification promotion and the miniaturization.

The conditional expression (2) is an expression for regulating the refractive power of the second lens group.

When an upper limit of the conditional expression (2) is exceeded, in the case where the high magnification promotion of the zoom lens is desired to be realized, the movement distance, of the second lens group, mainly taking a role of a change in magnification becomes too long. As a result, the total length of the zoom lens becomes too long to cause the increased scale.

Therefore, the zoom lens fulfills the conditional expression (2), thereby making it possible to realize the high magnification promotion and the miniaturization.

The conditional expression (3) is an expression for regulating the refractive power of the first lens group.

When a value of $|f1/(fw0ft)^{1/2}|$ falls below a lower limit of the conditional expression (3), since the refractive power of the first lens group becomes too strong, the decentering sensitivity of the first lens group becomes high and the difficulty level of the manufacture becomes high. In addition, the plastic lens of the first lens group needs to be given the strong positive refractive power in order to correct the aberration. However, if the value of $|f1/(fw0ft)^{1/2}|$ falls below the lower limit of the conditional expression (3), the performance deterioration due to the change in shape and the change in refractive index in the plastic lens becomes remarkable when the change in temperature or the change in humidity is generated.

Contrary to this, when the upper limit of the conditional expression (3) is exceeded, since a movement amount of second lens group is increased when the refractive power of the first lens group is weak, the total length of the zoom lens becomes too long in the wide angle end state.

Therefore, the zoom lens fulfills the conditional expression (3), whereby it is possible to realize the reduction in difficulty level of the manufacture and the high image quality promotion, the high magnification promotion and the miniaturization due to the enhancement of the performance.

In the zoom lens according to an embodiment of the present disclosure, conditional expressions (4) and (5) are preferably fulfilled:

$$|fP1/f1|>2.1 \qquad (4)$$

$$|fP2/f2|>4.0 \qquad (5)$$

where fP1 is a focal length of the plastic lens having the positive refractive power of the first lens group, and fP2 is a focal length of the plastic lens having the negative refractive power of the second lens group.

The conditional expressions (4) and (5) are expressions for regulating the refractive powers of the plastic lenses disposed in the first lens group and the second lens group, respectively.

When a value of either $|fP1/f1|$ or $|fP2/f2|$ falls below a lower limit of either the conditional expression (4) or (5), in the case where the miniaturization and the high magnification promotion are desired to be realized, the refractive power of the plastic lens becomes too strong. As a result, the decentering sensitivity in each of the first to third lens groups becomes high, and the assembly property becomes worse. In addition, the deterioration of the performance when the temperature change or the humidity change is generated is caused.

Therefore, the zoom lens fulfills the conditional expressions (4) and (5), whereby the refractive powers of the plastic lenses disposed in the first lens group and the second lens group, respectively, are appropriated. As a result, it is possible to realize the enhancement of the assembly property due to the suppression of the sensitivity of the relative decentering, and it is also possible to suppress the performance deterioration when the temperature change or the humidity change is generated.

It is noted that in the present disclosure, numerical value range of the conditional expressions (4) and (5) are preferably set in the ranges of conditional expressions (4)' and (5)', respectively:

$$|fP1/f1|>2.5 \qquad (4)'$$

$$|fP2/f2|>6.0 \qquad (5)'$$

The zoom lens fulfills the conditional expressions (4)' and (5)', whereby it is possible to realize the further enhancement of the assemble property due to the further suppression of the sensitivity of the relative decentering, and it is also possible to further suppress the performance deterioration when the temperature change or the humidity change is generated.

In the zoom lens according to an embodiment of the present disclosure, a conditional expression (6) is preferably fulfilled:

$$0.9 \leq Lw/Lt \leq 1.05 \quad (6)$$

where Lt is an optical total length in a telescopic end.

The conditional expression (6) is an expression for regulating a ratio between the optical total length in the wide angle end, and the optical total length in the telescopic end, and is also an expression necessary to miniaturize the zoom lens.

When a value of Lw/Lt either exceeds an upper limit of the conditional expression (6) or falls below a lower limit thereof, the optical total length of any one of the wide angle end or the telescopic end becomes too long.

Therefore, the zoom lens fulfills the conditional expression (6), whereby the optical total length in the wide angle end and in the telescopic end do not become too long, thereby making it possible to realize the miniaturization.

It is noted that in the present disclosure, a numerical value range of the conditional expression (6) is preferably set in the range of a conditional expression (6)':

$$0.97 \leq Lw/Lt \leq 1.05 \quad (6)'$$

The zoom lens fulfills the conditional expression (6)', thereby making it possible to realize the further miniaturization.

In the zoom lens according to an embodiment of the present disclosure, conditional expression (7) and (8) are preferably fulfilled:

$$1.55 \leq n1 \leq 1.7 \quad (7)$$

$$v1 > 60 \quad (8)$$

where n1 is a refractive index of the glass lens having the negative refractive power of the first lens group, and v1 is an Abbe's number of the glass lens having the negative refractive power of the first lens group.

The conditional expressions (7) and (8) are expressions for regulating the refractive index and the Abbe's number of the glass lens of the first lens group, respectively. Also, the conditional expressions (7) and (8) are expressions for suppressing the performance deterioration when the temperature change or the humidity change is generated by realizing both the high magnification promotion and the wide angle promotion, and suppressing the refractive power of the plastic lens of the first lens group.

When the refractive index, n1, falls below a lower limit of the conditional expression (7), for the purpose of strengthening the negative refractive power of the first lens group, it is necessary to form a surface, on the object side, of the glass lens having the negative refractive power as a concave surface having a small radius of curvature. As a result, it may be impossible to realize the miniaturization of the total length.

On the other hand, when the refractive index, n1, exceeds an upper limit of the conditional expression (7), for the purpose of carrying out the excellent aberration correction, it is necessary to strengthen the refractive power of the plastic lens having the positive refractive power. As a result, the performance deterioration when the temperature change or the humidity change is generated is caused. In addition, since the decentering sensitivity is increased, the difficulty of the manufacture is caused.

When the Abbe's number, v1, falls below a lower limit of the conditional expression (8), the chromatic aberration becomes easy to generate, and thus the optical performance is deteriorated.

Therefore, the zoom lens fulfills the conditional expressions (7) and (8), whereby the chromatic aberration can be suppressed while the positive refractive power of the plastic lens of the first lens group is suppressed. In addition, the performance deterioration when the temperature change or the humidity change is generated can also be suppressed. Also, the decentering sensitivity is suppressed, thereby making it possible to reduce the difficulty of the manufacture.

Zoom Lenses of First to Third Embodiments

Hereinafter, zoom lenses according to first to third embodiments of the present disclosure, and numerical examples which are obtained by applying concrete numerical values to the zoom lenses according to the first to third embodiments of the present disclosure will be described in detail with reference to the accompanying drawings and TABLES 1 to 13.

It is noted that meanings or the like of symbols which will be shown hereinafter in TABLES 1 to 13 and the descriptions are as follows.

"A surface number" represents an i-th surface counted from the object side to the image side (expressed as Ri in the drawings), and "a radius of curvature" represents a radius of curvature of the i-th surface. "A surface interval" represents a surface interval on an axis between the i-th surface and an (i+1)-th surface (a lens central thickness or an air interval), and "a refractive index" represents a refractive index in a d line ($\lambda$=587.6 nm) of a lens or the like beginning with the i-th surface. Also, "an Abbe's number" represents an Abbe's number in the d line of the lens or the like beginning with the i-th surface.

With regard to "the surface number," "ASP" represents that the surface concerned is an aspherical surface. With regard to "the radius of curvature," "0.0000" represents that the surface concerned is a flat surface. Also, with regard to "the surface interval," "Di" represents a variable interval.

"k" represents a conic constant, and "A4," "A6," "A8," and "A10" represent 4-order, 6-order, 8-order, and 10-order aspherical surface coefficients, respectively.

"f" represents a focal length of a lens entire system, "FNO" represents an F number (open F value), and "$\omega$" represents a half field angle.

It is noted that in the following TABLES 1 to 13 showing the aspherical surface coefficients, "E-n" represents an exponential expression with 10 as the base, that is, "$10^{-n}$." For example, "0.12345E-05" represents "$0.12345 \times 10^{-5}$."

In some zoom lenses used in the first to third embodiments, a lens surface is formed in the form of an aspherical surface. The aspherical surface shape is defined by Expression (1):

$$x = \frac{cy^2}{1 + \{1 - (1+\kappa)c^2y^2\}^{1/2}} + A4y^4 + A6y^6 + \ldots \quad (1)$$

where x is a distance in an optical axis direction from the apex of a lens surface, y is a height in a direction orthogonal to the optical axis direction, and c is a paraxial radius of curvature in the lens apex.

Zoom Lens of First Embodiment

FIG. 1 shows a lens construction of a zoom lens 1 according to a first embodiment of the present disclosure.

In the zoom lens 1, a variable magnification ratio is set to a magnification of 3.76. The zoom lens 1 suppresses refractive powers of plastic lenses after the plastic lenses are used in lens groups, respectively, to realize the magnification of 3.76 as the variable magnification ratio.

The zoom lens 1 is constructed in such a way that a first lens group G1 having a negative refractive power, a second lens group G2 having a positive refractive power, and a third lens group G3 having the positive refractive power are disposed from an object side to an image side in order.

In the zoom lens 1, the first lens group G1, the second lens group G2, and the third lens group G3 are moved in an optical axis direction when a zooming state is changed from a wide angle end state to a telescopic end state.

The first lens group G1 is constructed in such a way that a first lens L1 having a biconcave shape as a glass lens having the negative refractive power, and a second lens L2 having a meniscus shape and having a convex surface directed to the object side as a plastic lens having the positive refractive power are disposed from the object side to the image side in order.

The second lens group G2 is constructed in such a way that a cemented lens and a fifth lens L5 having a convex surface directed to the object side and having a concave surface directed to the image side as a plastic lens having the negative refractive power are disposed from the object side to the image side in order. In this case, a third lens L3 having a biconvex shape as a glass lens having the positive refractive power, and a fourth lens L4 having a biconcave shape as a glass lens having the negative refractive power are joined to each other, thereby obtaining the cemented lens.

The third lens group G3 is composed of a sixth lens L6 having a biconvex shape as a plastic lens having the positive refractive power.

An aperture stop S is disposed in the vicinity of the third lens L3 in a position, on the object side, of the second lens group G2.

A filter FL and a cover glass CG are disposed from the object side to the image side in order between the third lens group G3 and an image surface IMG.

TABLE 1 shows lens data in Numerical Example 1 in which concrete numerical values are applied to the zoom lens 1 of the first embodiment.

TABLE 1

| surface number | radius of curveture | surface interval | refractive index | Abbe's number |
|---|---|---|---|---|
| 1 | −86.8225 | 0.600 | 1.61800 | 63.4 |
| 2 | 6.4588 | 2.114 | | |
| 3 (ASP) | 12.7875 | 1.520 | 1.63219 | 23.0 |
| 4 (ASP) | 26.0000 | D4 | | |
| 5 (aperture stop) | 0.0000 | −0.300 | | |
| 6 | 5.0186 | 2.722 | 1.88047 | 40.1 |
| 7 | −5.2745 | 0.532 | 1.76182 | 26.6 |
| 8 | 5.7080 | 0.622 | | |
| 9 (ASP) | 8.6863 | 0.900 | 1.52470 | 56.2 |
| 10 (ASP) | 7.7379 | D10 | | |
| 11 (ASP) | 20.4331 | 1.600 | 1.52470 | 56.2 |
| 12 (ASP) | −12.9366 | D12 | | |
| 13 | 0.0000 | 0.100 | 1.45847 | 67.8 |

TABLE 1-continued

| surface number | radius of curveture | surface interval | refractive index | Abbe's number |
|---|---|---|---|---|
| 14 | 0.0000 | 0.000 | | |
| 15 | 0.0000 | 0.500 | 1.56883 | 56.0 |
| 16 | 0.0000 | 0.600 | | |
| IMG | 0.0000 | 0.000 | | |

In the zoom lens 1, both surfaces (third surface and fourth surface) of the second lens L2 of the first lens group G1, both surfaces (ninth surface and tenth surface) of the fifth lens L5 of the second lens group G2, and both surfaces (eleventh surface and twelfth surface) of the sixth lens L6 of the third lens group G3 are formed in the form of the aspherical surfaces, respectively. TABLE 2 shows the 4-order, 6-order, 8-order, and 10-order aspherical surface coefficients A4, A6, A8, and A10 of the aspherical surface in Numerical Example 1 together with the conic constant k.

TABLE 2

| surface-number | κ | A4 | A6 | A8 | A10 |
|---|---|---|---|---|---|
| 3 | 0.000000E+00 | −6.100000E−05 | −1.100000E−05 | 4.207698E−07 | −6.180496E−09 |
| 4 | 0.000000E+00 | −3.355460E−04 | −1.100000E−05 | 4.101066E−07 | −9.272325E−09 |
| 9 | 0.000000E+00 | −7.956920E−03 | −7.763250E−04 | 9.300000E−05 | −1.000000E−05 |
| 10 | 0.000000E+00 | −3.858660E−03 | −3.582360E−04 | 8.700000E−05 | −3.000000E−06 |
| 11 | 0.000000E+00 | 1.064430E−03 | −1.603880E−04 | 9.000000E−06 | −1.805444E−07 |
| 12 | 0.000000E+00 | 2.035640E−03 | −2.364860E−04 | 1.300000E−05 | −2.477782E−07 |

TABLE 3 shows the F number FNO, and the half field angle ω in the wide angle end state (f=5.15), the intermediate focal length state (f=9.98), and the telescopic end state (f=19.36) in Numerical Example 1.

TABLE 3

| | wide angle end | intermediate focal length | telescopic end |
|---|---|---|---|
| f | 5.15 | 9.78 | 19.36 |
| FNO | 2.99 | 4.11 | 6.42 |
| ω (°) | 39.08 | 21.76 | 11.16 |

In the zoom lens 1, a surface interval, D4, between the first lens group G1 and the second lens group G2 (aperture stop S), a surface interval, D10, between the second lens group G2 and the third kens group G3, and a surface interval, D12, between the third lens group G3 and the filter FL are changed during the zooming between the wide angle end state and the telescopic end state.

TABLE 4 shows variable intervals in the wide angle end state (f=5.15), the intermediate focal length state (f=9.78), and the telescopic end state (f=19.36) in the surface intervals in Numerical Example 1.

TABLE 4

| | wide angle end | intermediate focal length | telescopic end |
|---|---|---|---|
| f | 5.15 | 9.78 | 19.36 |
| D4 | 14.548 | 5.797 | 0.900 |
| D10 | 4.094 | 8.954 | 18.329 |
| D12 | 2.747 | 2.510 | 2.160 |

In the zoom lens 1, on the wide angle side, the interval between the first lens group G1 and the second lens group G2 is widened, and the interval between the second lens group G2 and the image surface IMG is shortened, whereby a principal point is made close to the image surface IMG to realize short focus. In addition, on the telescopic side, the interval between the first lens group G1 and the second lend group G2 is shortened, and the interval between the second lens group G2 and the image surface IMG is widened, whereby the principal point is distanced from the image surface IMG, thereby realizing long focus. In addition, the third lens group is made movable in the optical axis direction to cause the third lens group G3 to absorb the fluctuation of the focal point position in each of the field angles, whereby the high performance promotion is ensured after the miniaturization is ensured.

Figure 2:
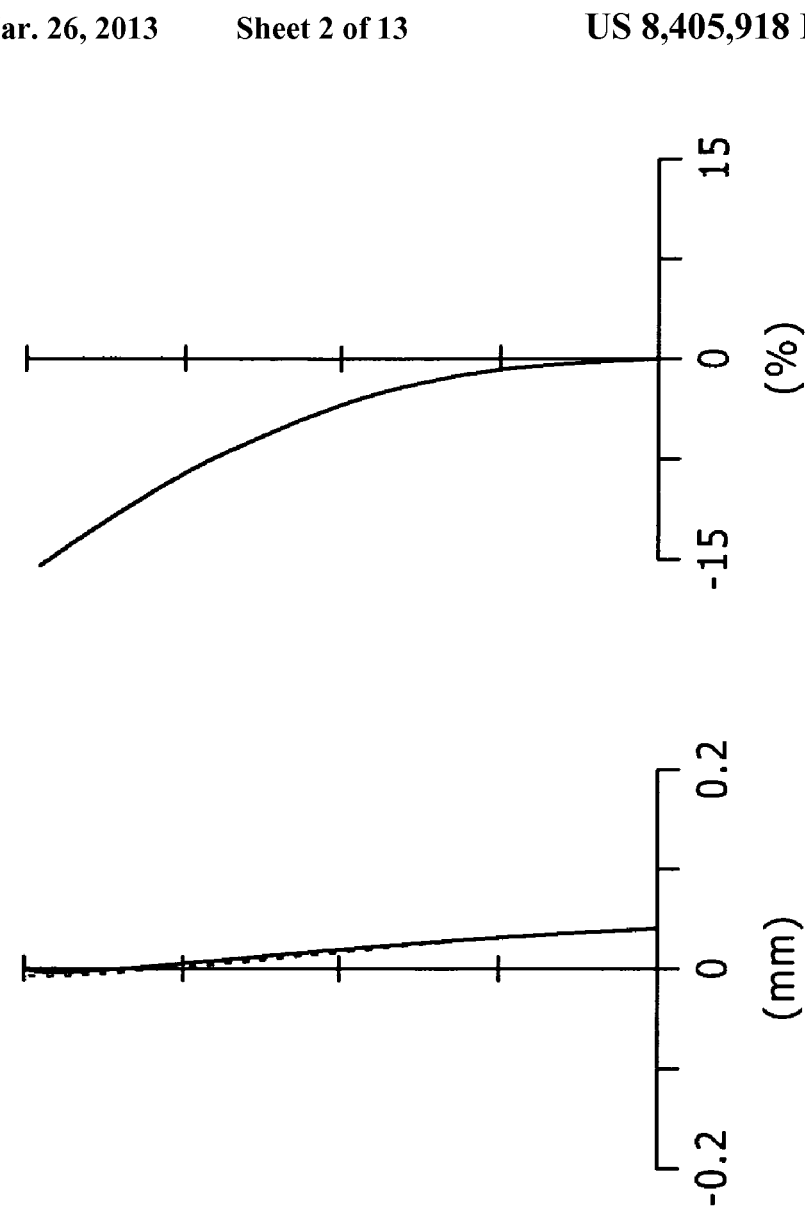
FIG. 2 is an aberration view of a numerical example in which concrete numerical values are applied to the zoom lens of the first embodiment together with FIGS. 3 and 4, and is also a view showing a spherical aberration, a curvature of field, and a distortion aberration in a wide angle end state.
Figure 3:
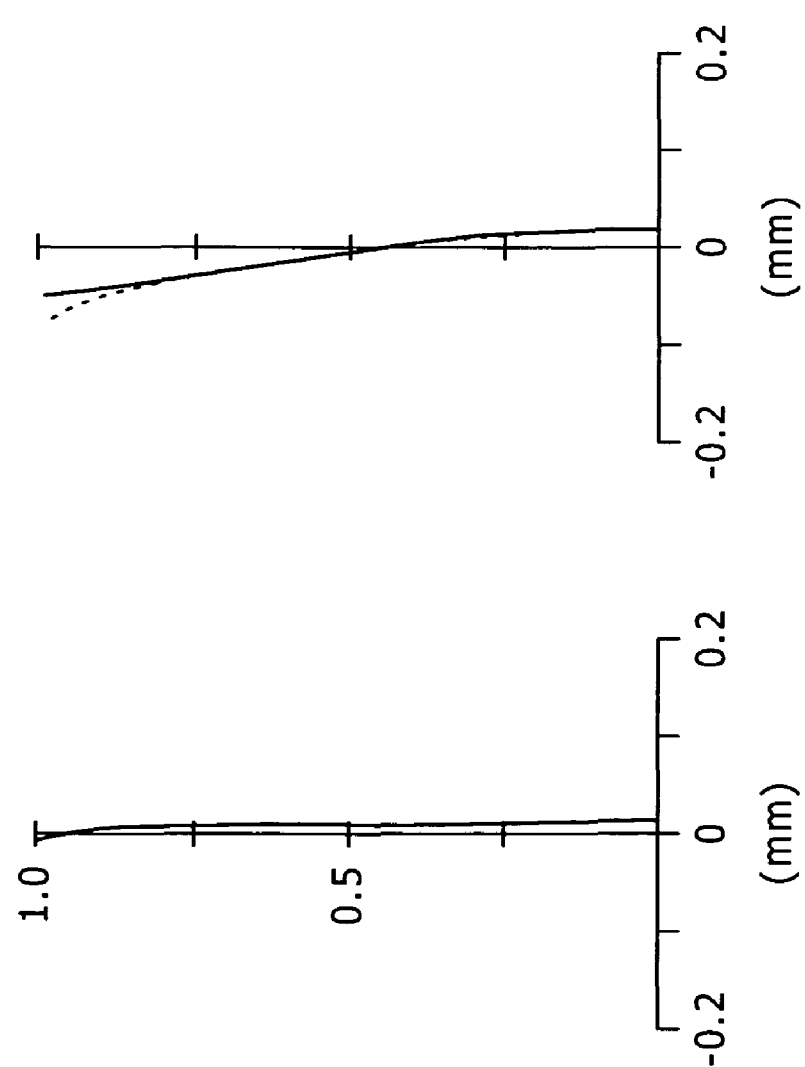
FIG. 3 is a view showing a spherical aberration, a curvature of field, and a distortion aberration in an intermediate focal length state.
Figure 4:
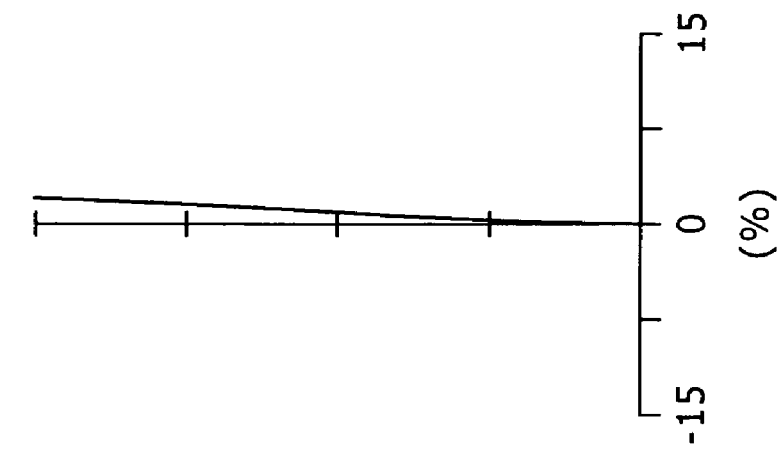
FIG. 4 is a view showing a view showing a spherical aberration, a curvature of field, and a distortion aberration in a telescopic end state.
Figure 4:
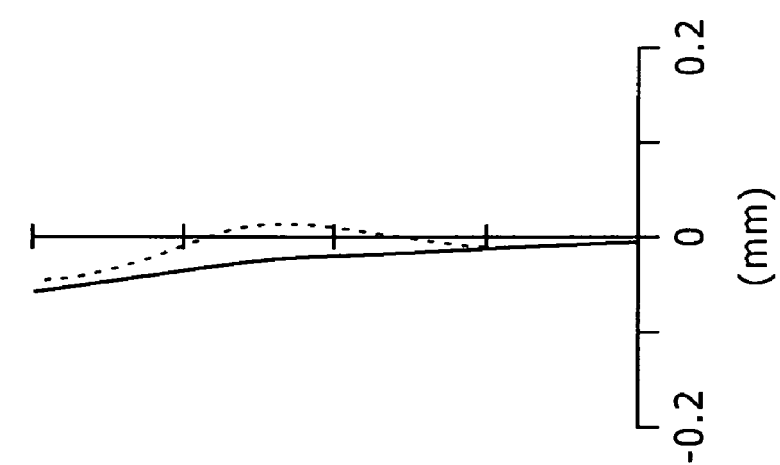
Figure 4:
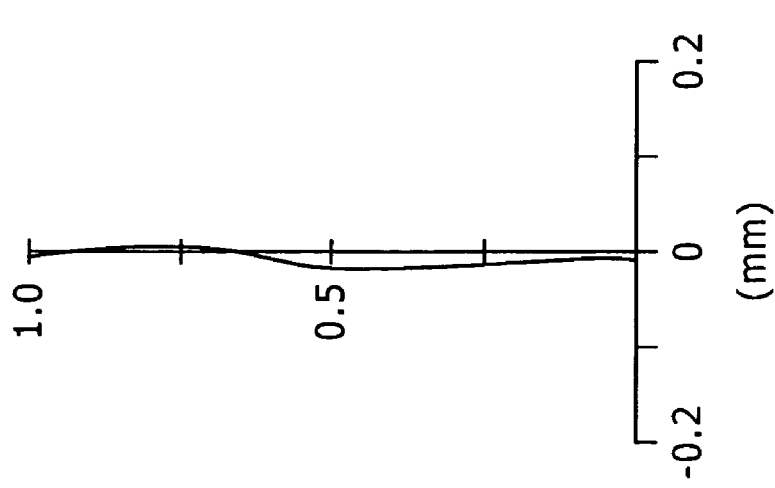

FIGS. 2 to 4 show aberration views in an infinity focusing state in Numerical Example 1. FIG. 2 shows a spherical aberration view, a view of a curvature of field, and a distortion aberration view in the wide angle end state. FIG. 3 shows a spherical aberration view, a view of a curvature of field, and a distortion aberration view in the intermediate focal length state. Also, FIG. 4 shows a spherical aberration view, a view of a curvature of field, and a distortion aberration view in the telescopic end state.

FIGS. 2 to 4 show aberration views for a d line having a wavelength of 587.6 nm. In this case, in the view of the curvature of field, values in a sagittal image surface are indicated by a solid line, and values in a meridional image surface are indicated by a dotted line.

It is obvious from the aberration views of FIGS. 2 to 4 that after the high magnification of 3.75 as the high variable magnification ratio is attained, the aberrations are satisfactorily corrected and thus Numerical Example 1 has the excellent imaging performance. It is noted that the distortion aberration generated in the wide angle end may be also electrically corrected.

Zoom Lens of Second Embodiment

Figure 5:
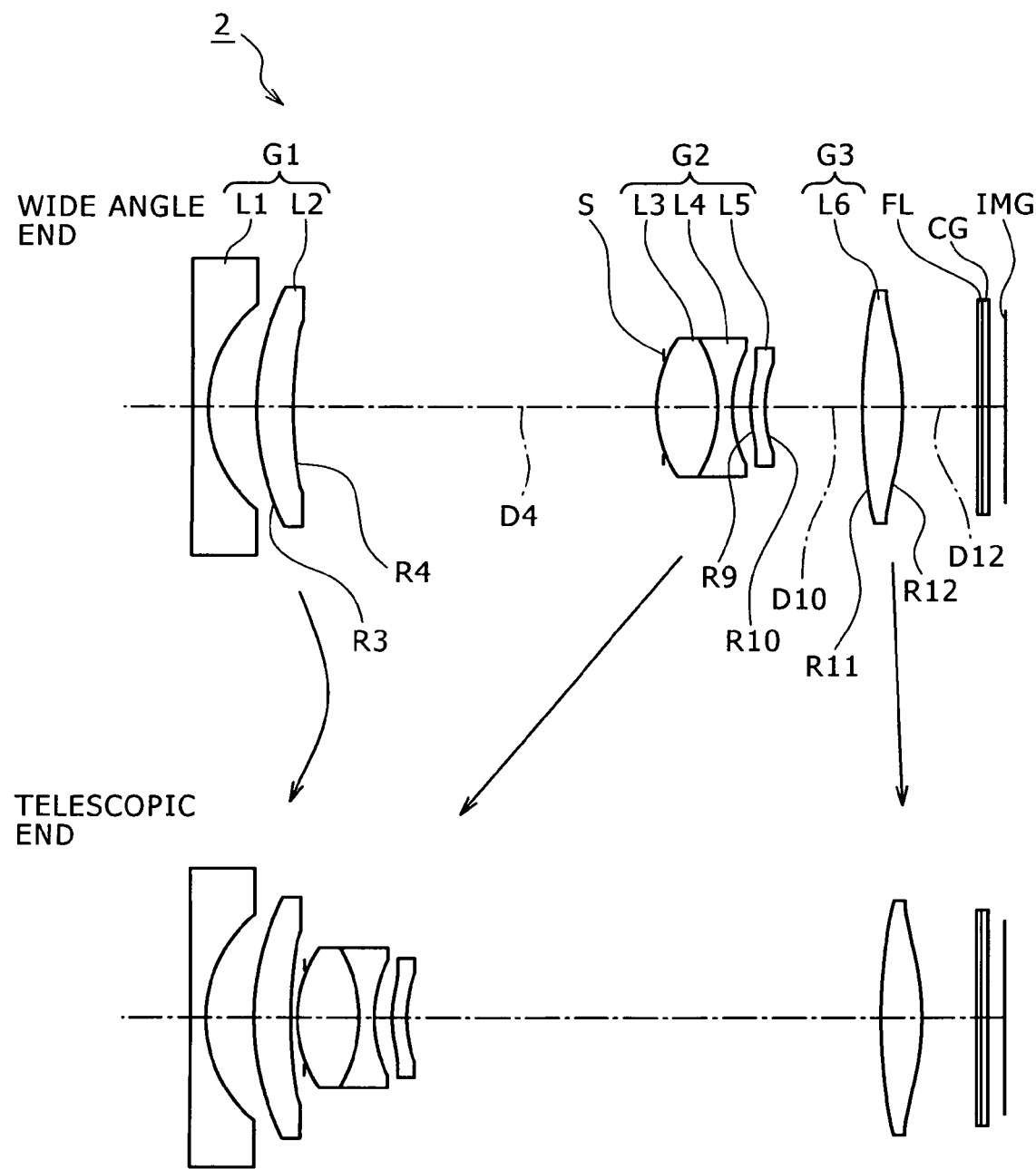
FIG. 5 is a view showing a lens construction of a zoom lens according to a second embodiment of the present disclosure.

FIG. 5 shows a lens construction of a zoom lens 2 according to a second embodiment of the present disclosure.

In the zoom lens 2, a variable magnification ratio is set to a magnification of 4.14. The zoom lens 2 suppresses refractive powers of plastic lenses after the plastic lenses are used in lens groups, respectively, to realize the magnification of 4.14 as the variable magnification ratio.

The zoom lens 2 is constructed in such a way that a first lens group G1 having a negative refractive power, a second lens group G2 having a positive refractive power, and a third lens group G3 having the positive refractive power are disposed from an object side to an image side in order.

In the zoom lens 2, the first lens group G1, the second lens group G2, and the third lens group G3 are moved in an optical axis direction when a zooming state is changed from a wide angle end state to a telescopic end state.

The first lens group G1 is constructed in such a way that a first lens L1 having a biconcave shape as a glass lens having the negative refractive power, and a second lens L2 having a meniscus shape and having a convex surface directed to the object side as a plastic lens having the positive refractive power are disposed from the object side to the image side in order.

The second lens group G2 is constructed in such a way that a cemented lens and a fifth lens L5 having a convex surface directed to the object side and having a concave surface directed to the image side as a plastic lens having the negative refractive power are disposed from the object side to the image side in order. In this case, a third lens L3 having a biconvex shape as a glass lens having the positive refractive power, and a fourth lens L4 having a biconcave shape as a glass lens having the negative refractive power are joined to each other, thereby obtaining the cemented lens.

The third lens group G3 is composed of a sixth lens L6 having a biconvex shape as a plastic lens having the positive refractive power.

An aperture stop S is disposed in the vicinity of the third lens L3 in a position, on the object side, of the second lens group G2.

A filter FL and a cover glass CG are disposed from the object side to the image side in order between the third lens group G3 and an image surface IMG.

TABLE 5 shows lens data in Numerical Example 2 in which concrete numerical values are applied to the zoom lens 2 of the second embodiment.

TABLE 5

| surface number | radius of curvature | surface interval | refractive index | Abbe's number |
|---|---|---|---|---|
| 1 | −380.9130 | 0.600 | 1.61800 | 63.4 |
| 2 | 6.1919 | 2.000 | | |
| 3 (ASP) | 10.3116 | 1.520 | 1.63219 | 23.0 |
| 4 (ASP) | 16.8852 | D4 | | |
| 5 (aperture stop) | 0.0000 | −0.300 | | |
| 6 | 5.2099 | 2.409 | 1.88047 | 40.1 |
| 7 | −7.0047 | 0.700 | 1.75211 | 25.1 |
| 8 | 6.6469 | 0.750 | | |
| 9 (ASP) | 6.7227 | 0.603 | 1.52470 | 56.2 |
| 10 (ASP) | 5.9704 | D10 | | |
| 11 (ASP) | 41.7827 | 1.600 | 1.52470 | 56.2 |
| 12 (ASP) | −12.1076 | D12 | | |
| 13 | 0.0000 | 0.100 | 1.45847 | 67.8 |
| 14 | 0.0000 | 0.000 | | |
| 15 | 0.0000 | 0.500 | 1.56883 | 56.0 |
| 16 | 0.0000 | 0.600 | | |
| IMG | 0.0000 | 0.000 | | |

In the zoom lens 2, both surfaces (third surface and fourth surface) of the second lens L2 of the first lens group G1, both surfaces (ninth surface and tenth surface) of the fifth lens L5 of the second lens group G2, and both surfaces (eleventh surface and twelfth surface) of the sixth lens L6 of the third lens group G3 are formed in the form of the aspherical surfaces, respectively. TABLE 6 shows the 4-order, 6-order, 8-order, and 10-order aspherical surface coefficients A4, A6, A8, and A10 of the aspherical surface in Numerical Example 2 together with the conic constant k.

TABLE 6

| surface number | κ | A4 | A6 | A8 | A10 |
|---|---|---|---|---|---|
| 3 | 0.000000E+00 | −2.474460E−04 | −6.000000E−06 | 1.077737E−07 | −6.252080E−09 |
| 4 | 0.000000E+00 | −5.136930E−04 | −7.000000E−06 | 2.075475E−08 | −6.430719E−09 |
| 9 | 0.000000E+00 | −6.361610E−03 | −6.213330E−04 | 5.500000E−05 | −5.000000E−06 |
| 10 | 0.000000E+00 | −2.745470E−03 | −3.866440E−04 | 5.900000E−05 | −1.000000E−06 |
| 11 | 0.000000E+00 | 6.093910E−04 | −1.418410E−04 | 1.000000E−05 | −1.990406E−07 |
| 12 | 0.000000E+00 | 1.324340E−03 | −2.001290E−04 | 1.300000E−05 | −2.541522E−07 |

TABLE 7 shows the F number FNO, and the half field angle ω in the wide angle end state (f=5.15), the intermediate focal length state (f=10.47), and the telescopic end state (f=21.30) in Numerical Example 2.

TABLE 7

|  | wide angle end | intermediate focal length | telescopic end |
|---|---|---|---|
| f | 5.15 | 10.47 | 21.30 |
| FNO | 3.03 | 4.32 | 6.83 |
| ω (°) | 39.24 | 20.49 | 10.24 |

In the zoom lens 2, a surface interval, D4, between the first lens group G1 and the second lens group G2 (aperture stop S), a surface interval, D10, between the second lens group G2 and the third kens group G3, and a surface interval, D12, between the third lens group G3 and the filter FL are changed during the zooming between the wide angle end state and the telescopic end state. TABLE 8 shows variable intervals in the wide angle end state (f=5.15), the intermediate focal length state (f=10.47), and the telescopic end state (f=21.30) in the surface intervals in Numerical Example 2.

TABLE 8

|  | wide angle end | intermediate focal length | telescopic end |
|---|---|---|---|
| f | 5.15 | 10.47 | 21.30 |
| D4 | 15.331 | 5.770 | 0.700 |
| D10 | 4.096 | 9.719 | 19.557 |
| D12 | 2.991 | 2.383 | 2.161 |

In the zoom lens 2, on the wide angle side, the interval between the first lens group G1 and the second lens group G2 is widened, and the interval between the second lens group G2 and the image surface IMG is shortened, whereby a principal point is made close to the image surface IMG to realize short focus. In addition, on the telescopic side, the interval between the first lens group G1 and the second lend group G2 is shortened, and the interval between the second lens group G2 and the image surface IMG is widened, whereby the principal point is distanced from the image surface IMG, thereby realizing long focus. In addition, the third lens group is made movable in the optical axis direction to cause the third lens group G3 to absorb the fluctuation of the focal point position in each of the field angles, whereby the high performance promotion is ensured after the miniaturization is ensured.

Figure 6:
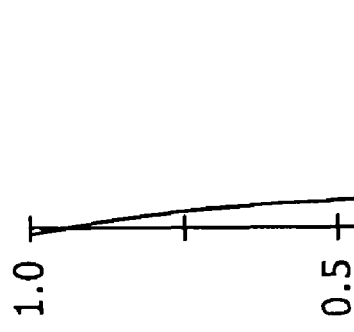
FIG. 6 is an aberration view of a numerical example in which concrete numerical values are applied to the zoom lens of the second embodiment together with FIGS. 7 and 8, and is also a view showing a spherical aberration, a curvature of field, and a distortion aberration in a wide angle end state.
Figure 6:
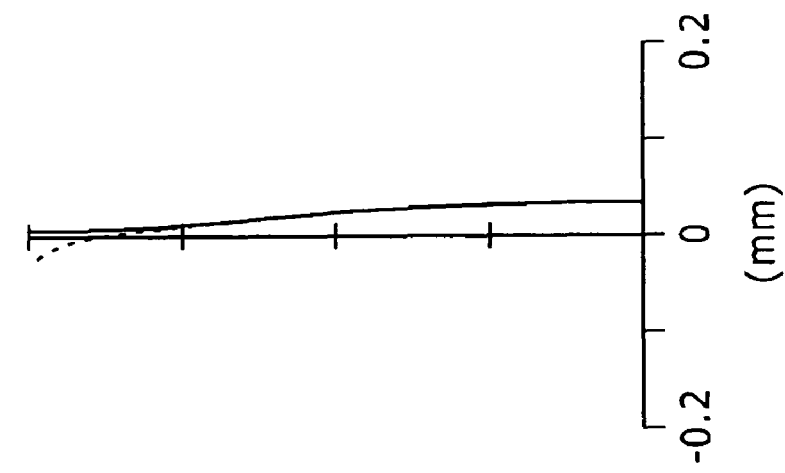
Figure 6:
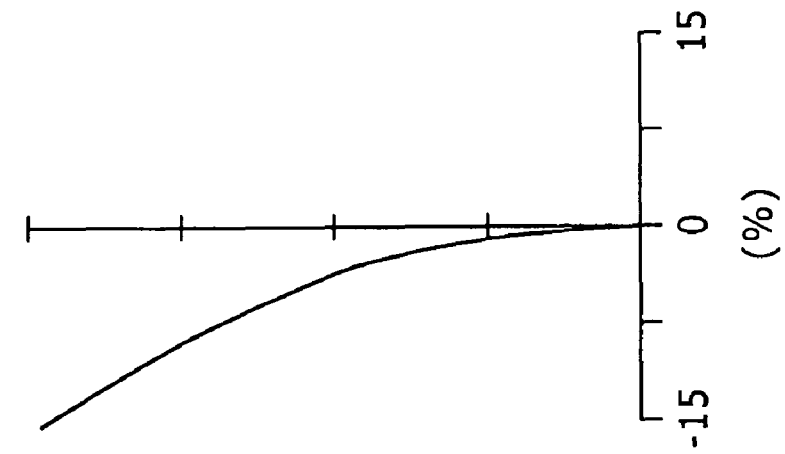
Figure 7:
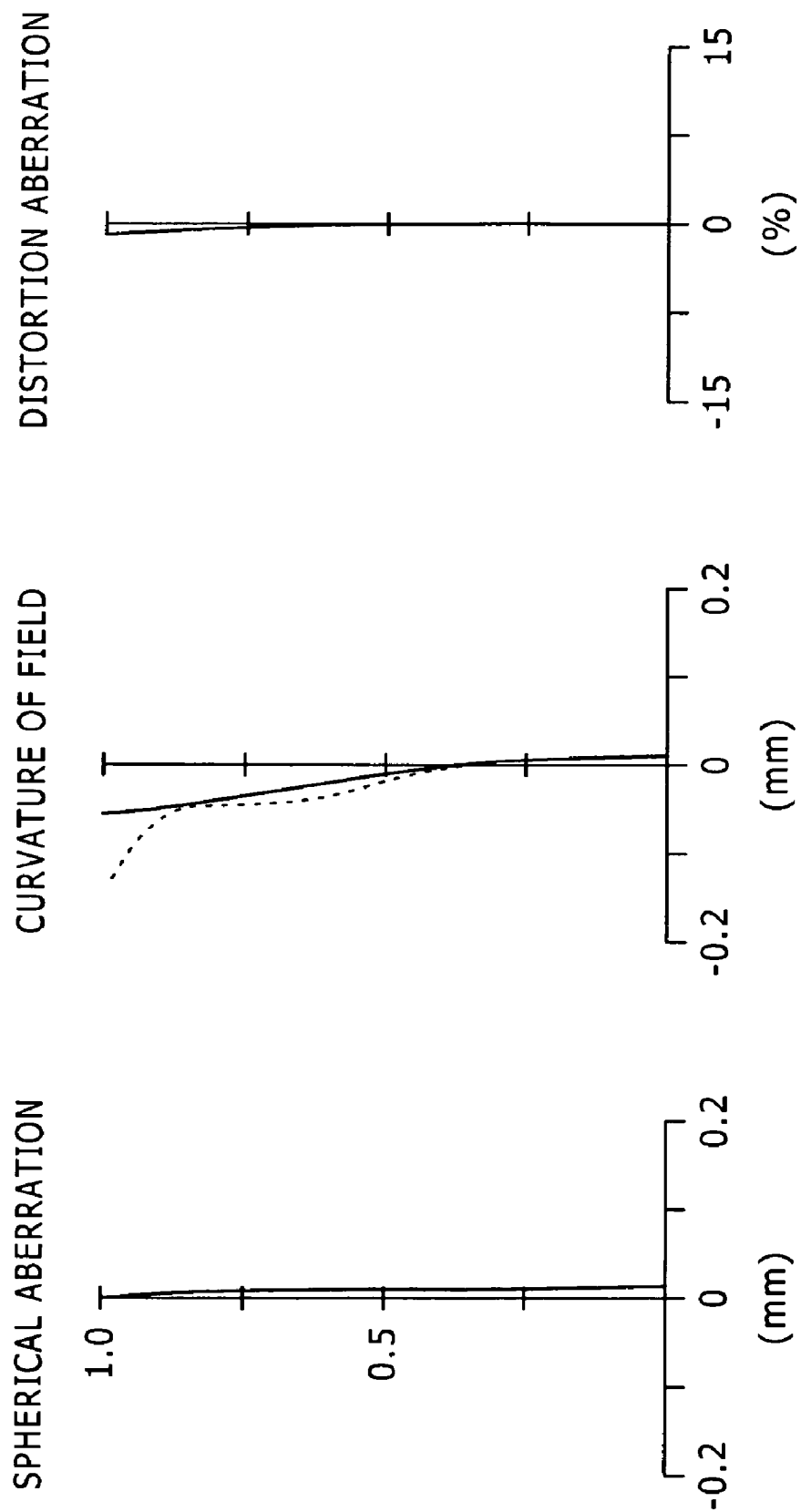
FIG. 7 is a view showing a view showing a spherical aberration, a curvature of field, and a distortion aberration in an intermediate focal length state.
Figure 8:
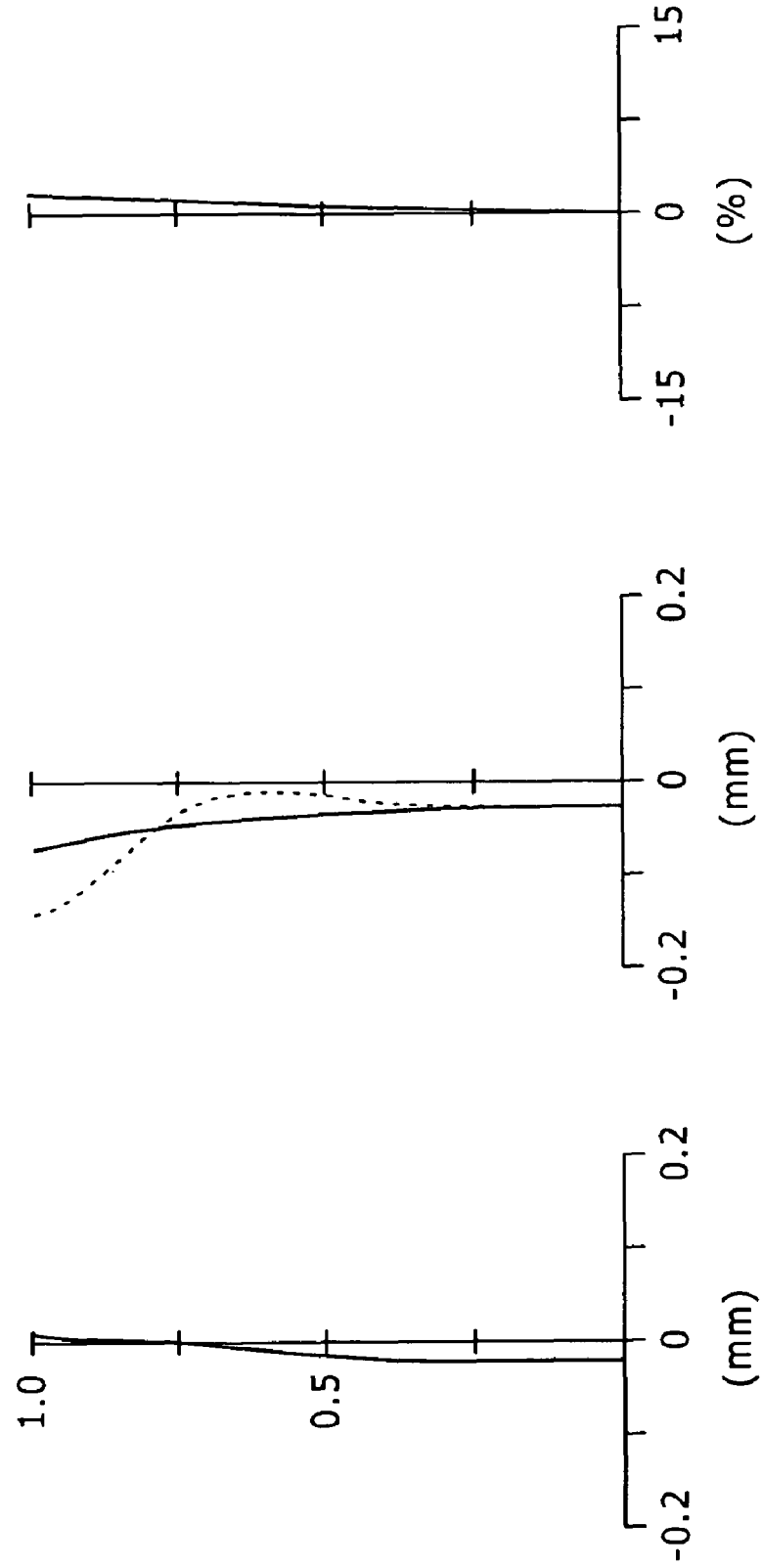
FIG. 8 is a view showing a view showing a spherical aberration, a curvature of field, and a distortion aberration in a telescopic end state.

FIGS. 6 to 8 show aberration views in an infinity focusing state in Numerical Example 2. FIG. 6 shows a spherical aberration view, a view of a curvature of field, and a distortion aberration view in the wide angle end state. FIG. 7 shows a spherical aberration view, a view of a curvature of field, and a distortion aberration view in the intermediate focal length state. Also, FIG. 8 shows a spherical aberration view, a view of a curvature of field, and a distortion aberration view in the telescopic end state.

FIGS. 6 to 8 show aberration views for a d line having a wavelength of 587.6 nm. In this case, in the view of the curvature of field, values in a sagittal image surface are indicated by a solid line, and values in a meridional image surface are indicated by a dotted line.

It is obvious from the aberration views of FIGS. 6 to 8 that after the high magnification of 4.14 as the high variable magnification ratio is attained, the aberrations are satisfactorily corrected and thus Numerical Example 2 has the excellent imaging performance. It is noted that the distortion aberration generated in the wide angle end may be also electrically corrected.

Zoom Lens of Third Embodiment

Figure 9:
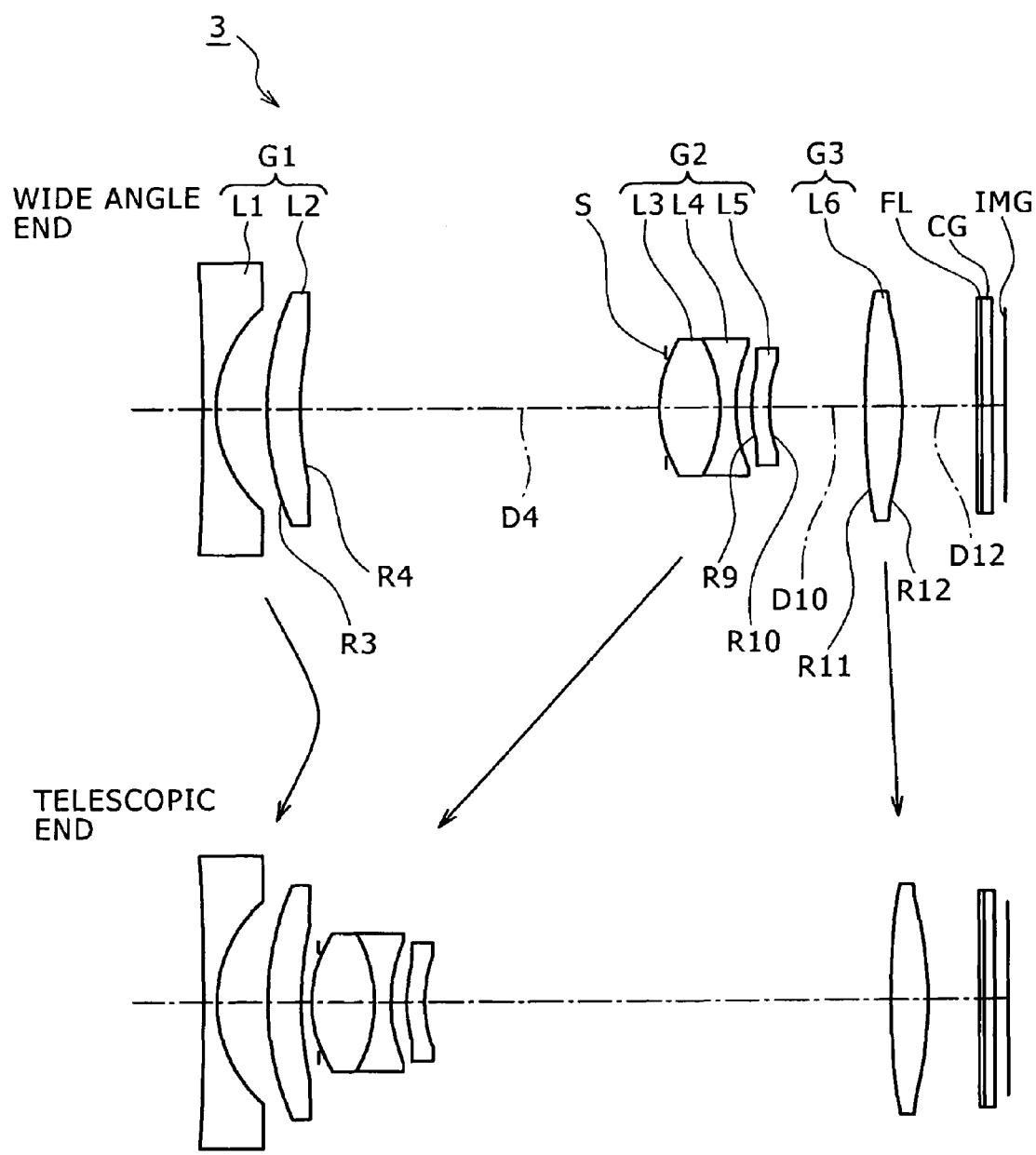
FIG. 9 is a view showing a lens construction of a zoom lens according to a third embodiment of the present disclosure.

FIG. 9 shows a lens construction of a zoom lens 3 according to a third embodiment of the present disclosure.

In the zoom lens 3, a variable magnification ratio is set to a magnification of 4.09. The zoom lens 1 suppresses refractive powers of plastic lenses after the plastic lenses are used in lens groups, respectively, to realize the magnification of 4.09 as the variable magnification ratio.

The zoom lens 3 is constructed in such a way that a first lens group G1 having a negative refractive power, a second lens group G2 having a positive refractive power, and a third lens group G3 having the positive refractive power are disposed from an object side to an image side in order.

In the zoom lens 3, the first lens group G1, the second lens group G2, and the third lens group G3 are moved in an optical axis direction when a zooming state is changed from a wide angle end state to a telescopic end state.

The first lens group G1 is constructed in such a way that a first lens L1 having a biconcave shape as a glass lens having the negative refractive power, and a second lens L2 having a meniscus shape and having a convex surface directed to the object side as a plastic lens having the positive refractive power are disposed from the object side to the image side in order.

The second lens group G2 is constructed in such a way that a cemented lens and a fifth lens L5 having a convex surface directed to the object side and having a concave surface directed to the image side as a plastic lens having the negative refractive power are disposed from the object side to the image side in order. In this case, a third lens L3 having a biconvex shape as a glass lens having the positive refractive power, and a fourth lens L4 having a biconcave shape as a glass lens having the negative refractive power are joined to each other, thereby obtaining the cemented lens.

The third lens group G3 is composed of a sixth lens L6 having a biconvex shape as a plastic lens having the positive refractive power.

An aperture stop S is disposed in the vicinity of the third lens L3 in a position, on the object side, of the second lens group G2.

A filter FL and a cover glass CG are disposed from the object side to the image side in order between the third lens group G3 and an image surface IMG.

TABLE 9 shows lens data in Numerical Example 3 in which concrete numerical values are applied to the zoom lens 3 of the third embodiment.

TABLE 9

| surface number | radius of curvature | surface interval | refractive index | Abbe's number |
|---|---|---|---|---|
| 1 | −372.4400 | 0.600 | 1.64000 | 60.2 |
| 2 | 6.3209 | 2.115 | | |
| 3 (ASP) | 10.8782 | 1.520 | 1.63219 | 23.0 |
| 4 (ASP) | 19.0713 | D4 | | |
| 5 (aperture stop) | 0.0000 | −0.300 | | |
| 6 | 5.2480 | 2.521 | 1.88047 | 40.1 |
| 7 | −6.8961 | 0.700 | 1.75211 | 25.1 |
| 8 | 6.5720 | 0.700 | | |
| 9 (ASP) | 6.6271 | 0.663 | 1.52470 | 56.2 |
| 10 (ASP) | 5.8709 | D10 | | |
| 11 (ASP) | 33.2330 | 1.600 | 1.52470 | 56.2 |
| 12 (ASP) | −12.8449 | D12 | | |
| 13 | 0.0000 | 0.100 | 1.45847 | 67.8 |
| 14 | 0.0000 | 0.000 | | |
| 15 | 0.0000 | 0.500 | 1.56883 | 56.0 |
| 16 | 0.0000 | 0.600 | | |
| IMG | 0.0000 | 0.000 | | |

In the zoom lens 3, both surfaces (third surface and fourth surface) of the second lens L2 of the first lens group G1, both surfaces (ninth surface and tenth surface) of the fifth lens L5 of the second lens group G2, and both surfaces (eleventh surface and twelfth surface) of the sixth lens L6 of the third lens group G3 are formed in the form of the aspherical surfaces, respectively. TABLE 10 shows the 4-order, 6-order, 8-order, and 10-order aspherical surface coefficients A4, A6, A8, and A10 of the aspherical surface in Numerical Example 3 together with the conic constant k.

TABLE 10

| surface number | κ | A4 | A6 | A8 | A10 |
|---|---|---|---|---|---|
| 3  | 0.000000E+00 | −1.521020E−04 | −5.000000E−06 |  4.609524E−08 | −7.228710E−09 |
| 4  | 0.000000E+00 | −4.080760E−04 | −4.000000E−06 | −1.766526E−07 | −3.566716E−09 |
| 9  | 0.000000E+00 | −6.174700E−03 | −6.515640E−04 |  6.300000E−05 | −7.000000E−06 |
| 10 | 0.000000E+00 | −2.581220E−03 | −4.205330E−04 |  6.500000E−05 | −3.000000E−06 |
| 11 | 0.000000E+00 |  6.771230E−04 | −1.072810E−04 |  7.000000E−06 | −1.367443E−07 |
| 12 | 0.000000E+00 |  1.339290E−03 | −1.533860E−04 |  9.000000E−06 | −1.775684E−07 |

TABLE 11 shows the F number FNO, and the half field angle ω in the wide angle end state (f=5.15), the intermediate focal length state (f=10.41), and the telescopic end state (f=21.06) in Numerical Example 3.

TABLE 11

|  | wide angle end | intermediate focal length | telescopic end |
|---|---|---|---|
| f | 5.15 | 10.41 | 21.06 |
| FNO | 3.05 | 4.33 | 6.86 |
| ω (°) | 39.17 | 20.57 | 10.38 |

In the zoom lens 3, a surface interval, D4, between the first lens group G1 and the second lens group G2 (aperture stop S), a surface interval, D10, between the second lens group G2 and the third kens group G3, and a surface interval, D12, between the third lens group G3 and the filter FL are changed during the zooming between the wide angle end state and the telescopic end state. TABLE 12 shows variable intervals in the wide angle end state (f=5.15), the intermediate focal length state (f=10.41), and the telescopic end state (f=21.06) in the surface intervals in Numerical Example 3.

TABLE 12

|  | wide angle end | intermediate focal length | telescopic end |
|---|---|---|---|
| f | 5.15 | 10.41 | 21.06 |
| D4 | 15.318 | 5.671 | 0.700 |
| D10 | 4.084 | 9.574 | 19.508 |
| D12 | 2.978 | 2.531 | 2.156 |

In the zoom lens 3, on the wide angle side, the interval between the first lens group G1 and the second lens group G2 is widened, and the interval between the second lens group G2 and the image surface IMG is shortened, whereby a principal point is made close to the image surface IMG to realize short focus. In addition, on the telescopic side, the interval between the first lens group G1 and the second lend group G2 is shortened, and the interval between the second lens group G2 and the image surface IMG is widened, whereby the principal point is distanced from the image surface IMG, thereby realizing long focus. In addition, the third lens group is made movable in the optical axis direction to cause the third lens group G3 to absorb the fluctuation of the focal point position in each of the field angles, whereby the high performance promotion is ensured after the miniaturization is ensured.

Figure 10:
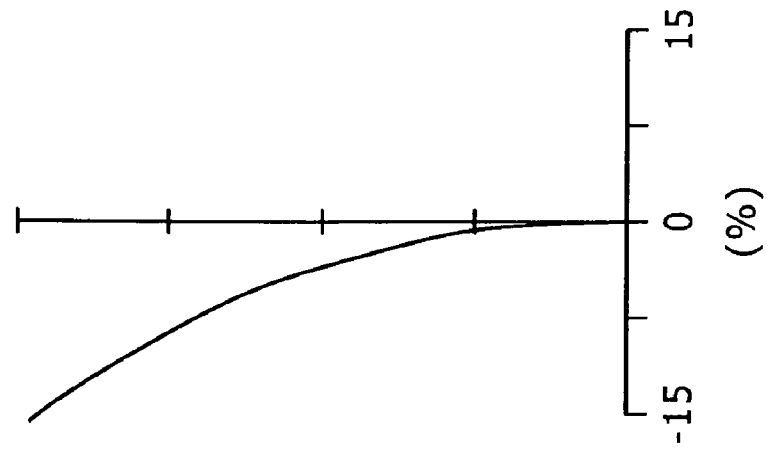
FIG. 10 is an aberration view of a numerical example in which concrete numerical values are applied to the zoom lens of the third embodiment together with FIGS. 11 and 12, and is also a view showing a spherical aberration, a curvature of field, and a distortion aberration in a wide angle end state.
Figure 10:
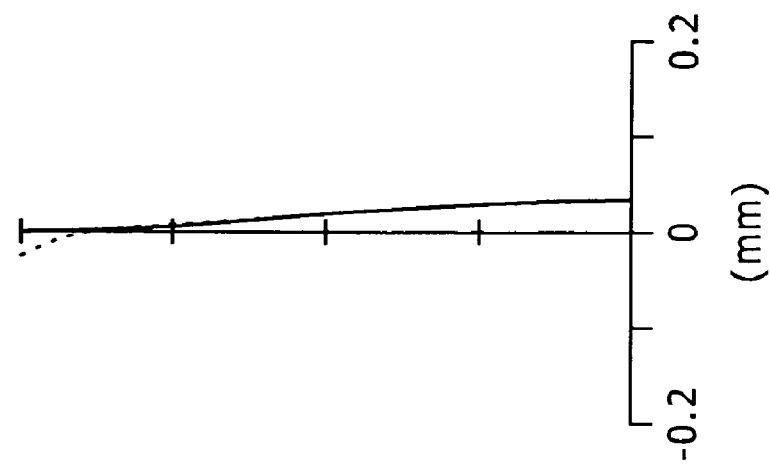
Figure 10:
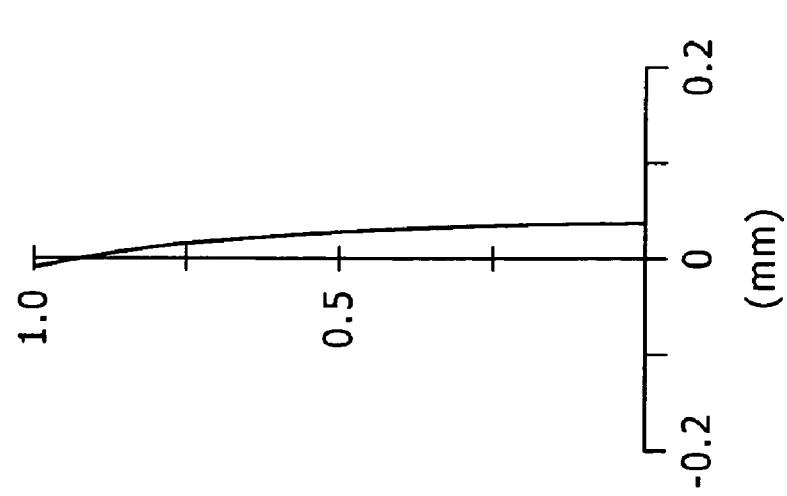
Figure 11:
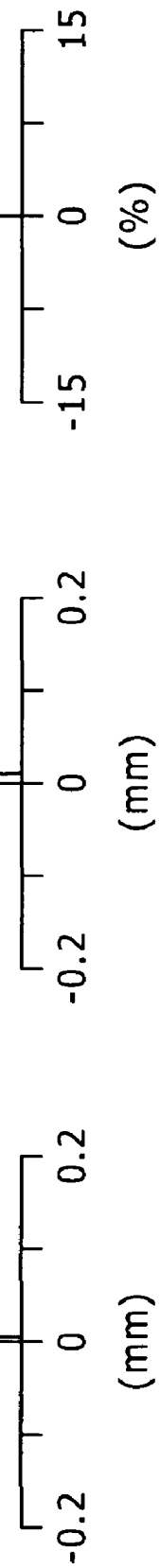
FIG. 11 is a view showing a spherical aberration, a curvature of field, and a distortion aberration in an intermediate focal length state.
Figure 12:
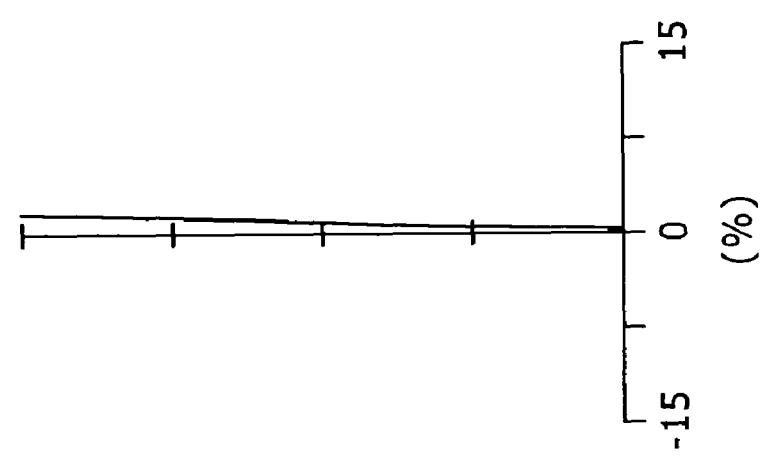
FIG. 12 is a view showing a spherical aberration, a curvature of field, and a distortion aberration in a telescopic end state.
Figure 12:
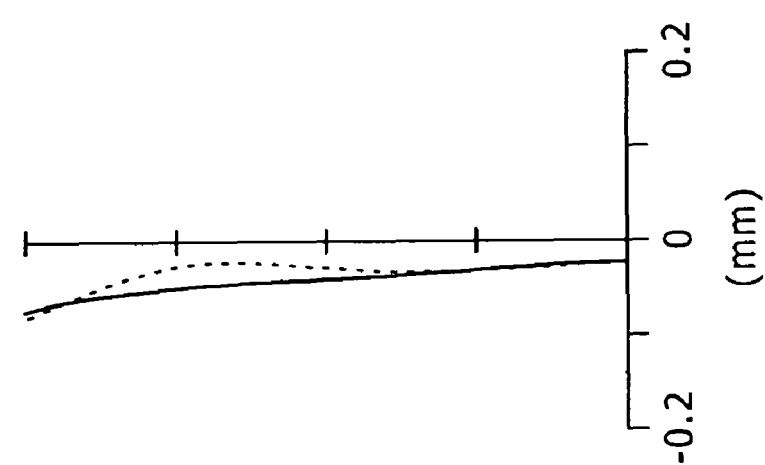
Figure 12:
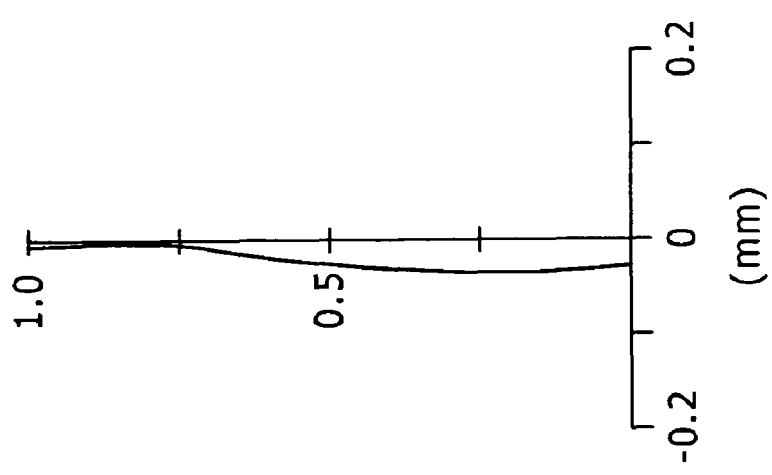

FIGS. 10 to 12 show aberration views in an infinity focusing state in Numerical Example 3. FIG. 10 shows a spherical aberration view, a view of a curvature of field, and a distortion aberration view in the wide angle end state. FIG. 11 shows a spherical aberration view, a view of a curvature of field, and a distortion aberration view in the intermediate focal length state. Also, FIG. 12 shows a spherical aberration view, a view of a curvature of field, and a distortion aberration view in the telescopic end state.

FIGS. 10 to 12 show aberration views for a d line having a wavelength of 587.6 nm. In this case, in the view of the curvature of field, values in a sagittal image surface are indicated by a solid line, and values in a meridional image surface are indicated by a dotted line.

It is obvious from the aberration views of FIGS. 10 to 12 that after the high magnification of 4.09 as the high variable magnification ratio is attained, the aberrations are satisfactorily corrected and thus Numerical Example 3 has the excellent imaging performance. It is noted that the distortion aberration generated in the wide angle end may be also electrically corrected.

Values of Conditional Expressions

TABLE 13 shows values of the conditional expressions (1) to (8) in the zoom lenses 1 to 3 according to the first to third embodiment of the present disclosure.

TABLE 13

|  |  | zoom lens 1 | zoom lens 2 | zoom lens 3 |
|---|---|---|---|---|
|  | Lw | 32.90 | 33.50 | 33.70 |
|  | fw | 5.15 | 5.15 | 5.15 |
|  | ωw | 39.08 | 39.24 | 39.17 |
| conditional expression (1) | $Lw/(fw \cdot \tan\omega w) < 9.0$ | 7.868 | 7.966 | 8.039 |
|  | f2 | 9.86 | 9.79 | 9.86 |
|  | ft | 19.36 | 21.30 | 21.06 |
| conditional expression (2) | $|f2/(fw \cdot ft)^{1/2}| < 1.0$ | 0.988 | 0.935 | 0.947 |
|  | f1 | −13.63 | −13.55 | −13.58 |

TABLE 13-continued

| | | zoom lens 1 | zoom lens 2 | zoom lens 3 |
|---|---|---|---|---|
| conditional expression (3) | $1.2 < |f1/(fw \cdot ft)^{1/2}| < 1.4$ | 1.365 | 1.294 | 1.304 |
| | fP1 | 37.69 | 38.02 | 36.95 |
| conditional expression (4) | $|fP1/f1| > 2.1$ | 2.766 | 2.805 | 2.722 |
| | fP2 | −200.00 | −140.00 | −140.00 |
| conditional expression (5) | $|fP2/f2| > 4.0$ | 20.283 | 14.304 | 14.196 |
| | Lt | 32.90 | 33.50 | 33.70 |
| conditional expression (6) | $0.9 \leq Lw/Lt \leq 1.05$ | 1.000 | 1.000 | 1.000 |
| conditional expression (7) | $1.55 \leq nP1 \leq 1.7$ | 1.618 | 1.618 | 1.640 |
| conditional expression (8) | $vP1 > 60$ | 63.39 | 63.39 | 60.20 |

As can be seen from TABLE 13, each of the zoom lenses 1 to 3 fulfills the conditional expressions (1) to (8).

Configuration of Imaging Apparatus

An imaging apparatus according to a fourth embodiment of the present disclosure includes a zoom lens, and an imaging element for converting an optical image formed by the zoom lens into an electrical signal. The zoom lens is constructed in such a way that a first lens group having a negative refractive power, a second lens group having a positive refractive power, and a third lens group having the positive refractive power are disposed from an object side to an image side in order. When a zooming state is changed from a wide angle end state to a telescopic end state, at least the first lens group and the second lens group are movable.

In addition, in the imaging apparatus according to the fourth embodiment of the present disclosure, in the zoom lens, the first lens group is constructed in such a way that a glass lens having the negative refractive power and a plastic lens having the positive refractive power are disposed from the object side to the image side in order. The second lens group is constructed in such a way that a cemented lens composed of a glass lens having the positive refractive power and located on the object side, and a glass lens having the negative refractive power and located on the image side, and a plastic lens having the negative refractive power are disposed from the object side to the image side in order. The third lens group has at least one plastic lens having the positive refractive power.

Moreover, in the imaging apparatus according to the fourth embodiment of the present disclosure, the zoom lens fulfills conditional expressions (1) to (3):

$$Lw/(fw0 \tan \omega w) < 9.0 \quad (1)$$

$$|f2/(fw0ft)^{1/2}| < 1.0 \quad (2)$$

$$1.2 < |f1/(fw0ft)^{1/2}| < 1.4 \quad (3)$$

where Lw is an optical total length in a wide angle end, fw is a focal length of a lens entire system in the wide angle end, ωw is a half field angle in the wide angle end, f2 is a focal length of the second lens group, ft is a focal length of the lens entire system in a telescopic end, and f1 is a focal length of the first lens group.

As described above, in the zoom lens of the present disclosure, in the three lens groups construction having the negative refractive power, the positive refractive power, and the positive refractive power (negative, positive, and positive) the plastic lenses are used in the lens groups, respectively, thereby making it possible to reduce the manufacturing cost.

In addition, the first lens group is composed of two sheets of lenses. Also, a glass lens is used as a negative lens on the object side, and a plastic lens is used as a positive lens on the image side, whereby in general, the plastic lens having the small refractive index can be effectively disposed in the first lens group having the negative refractive power as a whole. That is to say, using the plastic lens as the positive lens of the first lens group results in that the refractive power of the plastic lens can be suppressed and also the performance deterioration when a temperature change or a humidity change is generated can be suppressed as compared with the case where the plastic lens is used as the negative lens.

In addition, no plastic lens is used as the negative lens on the object side of the first lens group, and the plastic lens is used as the positive lens, whereby an outside diameter of the plastic lens can be reduced, and the securement of the strength of the lens, and the enhancement of the moldability can be realized.

Moreover, the plastic lens of the first lens group is constructed in the form of the positive lens, and the negative lens of the second lens group is constructed in the form of the plastic lens. Therefore, a fluctuation in back focus when the temperature change or the humidity change is generated can be cancelled by a fluctuation in back focus of the plastic lens of the second lens group for a fluctuation in back focus of the plastic lens of the first lens group. As a result, the enhancement of the optical performance can be realized.

In addition thereto, in general, when the number of constructional sheets of the first lens group is reduced in order to realize the miniaturization, the lens of the first lens group needs to be constructed in the form of an aspherical lens in order to suppress the generation of the aberration. However, in the zoom lens of the present disclosure, the plastic lens is used as the lens of the first lens group, and the plastic lens is constructed in the form of an aspherical lens. Therefore, it is unnecessary to form an aspherical surface in the glass lens. Thus, after securement of the reduction in manufacturing cost, the miniaturization and the securement of the excellent aberration correcting function can be realized.

As described above, in the imaging apparatus of the present disclosure, the zoom lens of the present disclosure adopts the construction such that after the reduction in manufacturing cost is realized by using the plastic lenses in the first to third lens groups, respectively, the conditional expressions (1), (2) and (3) are fulfilled as will be described below, thereby realizing the miniaturization, the high image quality promotion, and the high magnification promotion.

The conditional expression (1) is an expression for regulating a relationship between the optical entire length in the wide angle end, and the focal length and field angle of the lens entire system in the wide angle end.

When the upper limit of the conditional expression (1) is exceeded, even though it is possible to realize the high magnification promotion, the total length of the zoom lens becomes too long to cause the increased scale.

Therefore, in the imaging apparatus of the present disclosure, the zoom lens fulfills the conditional expression (1), thereby making it possible to realize the high magnification promotion and the miniaturization.

The conditional expression (2) is an expression for regulating the refractive power of the second lens group.

When an upper limit of the conditional expression (2) is exceeded, in the case where the high magnification promotion of the zoom lens is desired to be realized, the movement distance, of the second lens group, mainly taking a role of a change in magnification becomes too long. As a result, the total length of the zoom lens becomes too long to cause the increased scale.

Therefore, in the imaging apparatus of the present disclosure, the zoom lens fulfills the conditional expression (2), thereby making it possible to realize the high magnification promotion and the miniaturization.

The conditional expression (3) is an expression for regulating the refractive power of the first lens group.

When a value of $|f1/(fw0ft)^{1/2}|$ falls below a lower limit of the conditional expression (3), since the refractive power of the first lens group becomes too strong, the decentering sensitivity of the first lens group becomes high and the difficulty level of the manufacture becomes high. In addition, the plastic lens of the first lens group needs to be given the strong positive refractive power in order to correct the aberration. However, if the value of $|f1/(fw0ft)^{1/2}|$ falls below the lower limit of the conditional expression (3), the performance deterioration due to the change in shape and the change in refractive index in the plastic lens becomes remarkable when the change in temperature or the change in humidity is generated.

Contrary to this, when the upper limit of the conditional expression (3) is exceeded, since a movement amount of second lens group is increased when the refractive power of the first lens group is weak, the total length of the zoom lens becomes too long in the wide angle end state.

Therefore, the zoom lens fulfills the conditional expression (3), whereby it is possible to realize the reduction in difficulty level of the manufacture and the high image quality promotion, the high magnification promotion and the miniaturization due to the enhancement of the performance.

Therefore, in the imaging apparatus, the zoom lens fulfills the conditional expression (3), whereby it is possible to realize the reduction in difficulty level of the manufacture, and the high image quality promotion, the high magnification promotion and the miniaturization due to the enhancement of the performance.

Imaging Apparatus of Fourth Embodiment

Figure 13:
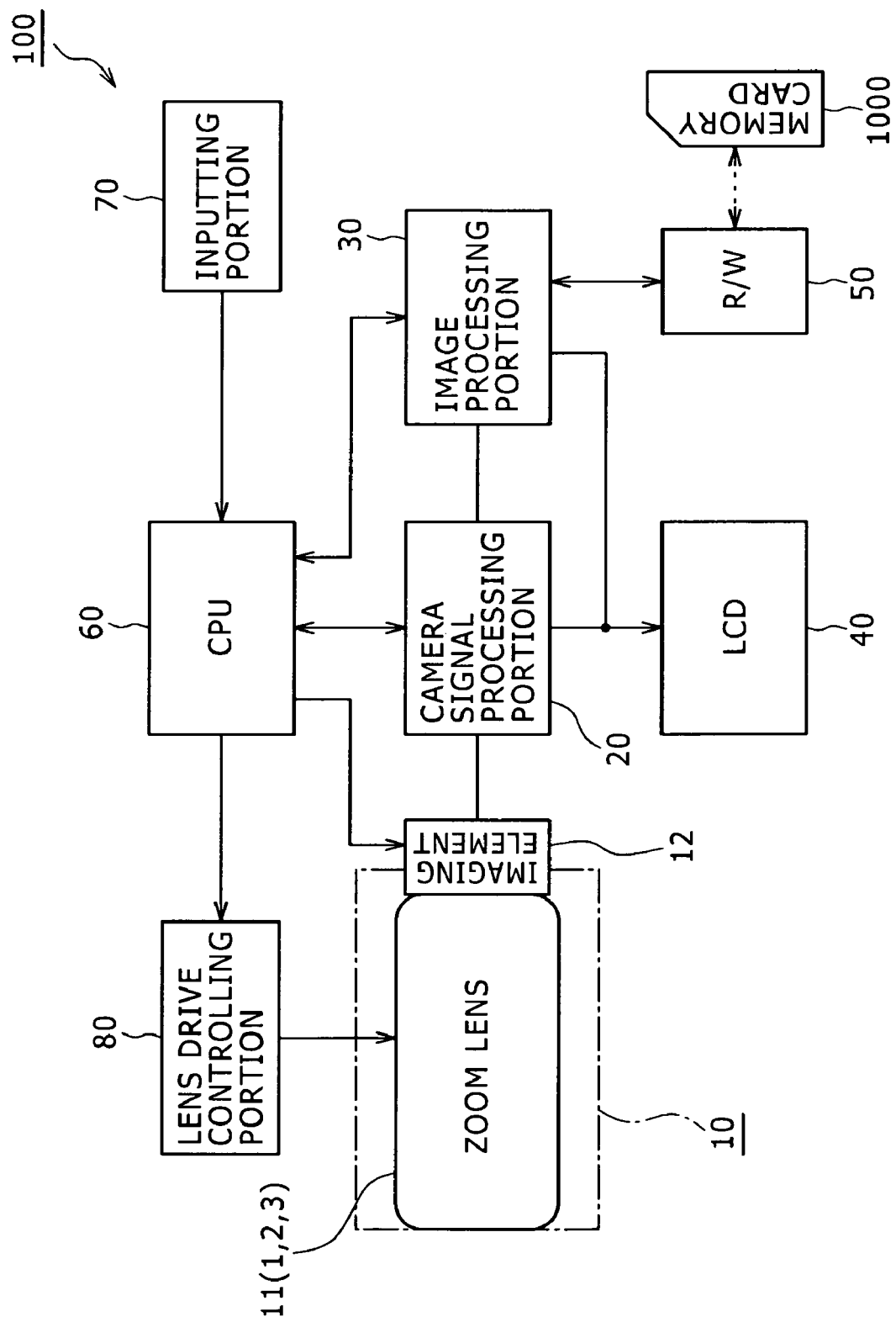
FIG. 13 is a block diagram showing a configuration of an imaging apparatus according to a fourth embodiment of the present disclosure.

FIG. 13 shows a block diagram of a digital still camera as an imaging apparatus according to a fourth embodiment of the present disclosure.

The imaging apparatus (digital still camera) 100 includes a camera block 10, a camera signal processing portion 20, and an image processing portion 30. In this case, the camera block 10 takes the function of, image capturing. The camera signal processing 20 executes signal processing such as analog-to-digital conversion for an image signal corresponding to an image captured by the camera block 10. Also, the image processing portion 30 executes processing for recording/reproducing the image signal. In addition, the imaging apparatus 100 includes a Liquid Crystal Display (LCD) device 40, a Reader/Writer (R/W) 50, a Central Processing Unit (CPU) 60, an inputting portion 70, and a lens drive controlling portion 80. In this case, the LCD device 40 displays thereon the image or the like captured by the camera block 10. The R/W 50 writes and reads out the image signal to and from a memory card 1000. The CPU 60 controls the entire operation of the imaging apparatus 100. The inputting portion 70 is composed of various kinds of switches or the like with which the user carries out the desired manipulation. Also, the lens drive controlling portion 80 controls the drive for the lenses disposed in the camera block 10.

The camera block 10 is composed of an optical system including a zoom lens 11 (such as the zoom lens 1, 2 or 3 to which the present disclosure is applied), an imaging element 12 such as a Charge Coupled Device (CCD) or a Complementary Metal Oxide Semiconductor (CMOS), and the like.

The camera signal processing portion 20 executes various kinds of signal processing such as processing for converting an output signal supplied thereto from the imaging element 12 into a digital signal, processing for removing a noise from the output signal supplied thereto from the imaging element 12, processing for correcting an image quality for the output signal from the imaging element 12, and processing for converting the output signal from the imaging element 12 into a luminanceocolor difference signal.

The image processing portion 30 executes processing for compression encoding/expansion decoding the image signal in accordance with a predetermined image data format, processing for converting a data specification such as a resolution, and the like.

The LCD device 40 has a function of displaying thereon various kinds of data on a state of a manipulation made for the inputting portion 70 by the user, the captured image and the like.

The R/W 50 writes image data encoded by the image processing portion 30 to the memory card 1000 and reads out image data recorded in the memory card 1000 from the memory card 1000.

The CPU 60 functions as a control processing portion for controlling the individual circuit blocks provided in the imaging apparatus 100. Also, the CPU 60 controls the individual circuit blocks in accordance with an instruction input signal or the like output thereto from the inputting portion 70.

The inputting portion 70, for example, is composed of a shutter release button with which a shutter manipulation is carried out by the user, a selection switch with which an operation mode is selected by the user, or the like. Also, the inputting portion 70 outputs the instruction input signal corresponding to the manipulation made by the user to the CPU 60.

The lens drive controlling portion 80 controls a motor or the like (not shown) for driving the lenses of the zoom lens 11 in accordance with a control signal issued thereto from the CPU 60.

The memory card 1000, for example, is a semiconductor memory which is detachably inserted into a slot connected to the R/W 50.

Hereinafter, an operation of the imaging apparatus 100 will be described in detail.

In a stand-by state of the image capturing, a signal of an image captured by the camera block 10 is output to the LCD device 40 through the camera signal processing portion 20 under the control made by the CPU 60 to be displayed as a camera-through image on the LCD device 40. In addition, when the instruction input signal for zooming has been input from the inputting portion 70 to the CPU 60, the CPU 60 outputs the control signal to the lens drive controlling portion 80, so that the predetermined lens(es) of the zoom lens 11 is(are) moved in accordance with the control made by the lens drive controlling portion 80.

When a shutter button (not shown) of the camera block 10 has been operated in accordance with the instruction input signal output from the inputting portion 70, the signal of the image captured by the camera block 10 is output from the camera signal processing portion 20 to the image processing portion 30, and is then subjected to compression encoding processing to be converted into digital data complying with a predetermined data format. The data obtained through the analog-to-digital conversion is output to the R/W 50 and is then written to the memory card 1000.

It is noted that, for example, in the case where the shutter release button of the inputting portion 70 is depressed half-way, in the case where the shutter release button of the inputting portion 70 is fully depressed for the recording (image capturing), or in any other suitable case, the lens drive controlling portion 80 moves the predetermined lens(es) of the zoom lens 11 in accordance with the control signal supplied thereto from the CPU 60, thereby carrying out the focusing.

When the image data recorded in the memory card 1000 is desired to be reproduced, predetermined image data is read out from the memory card 1000 by the R/W 50 in accordance with the manipulation made for the inputting portion 70 by the user, and is then subjected to the expansion decoding processing by the image processing portion 30. After that, a regenerative image signal is output to the LCD device 40, thereby displaying the regenerative image on the LCD device 40.

It should be noted that in the fourth embodiment of the present disclosure, the description has been given so far with respect to the case where the imaging apparatus is applied to the digital still camera, the application range of the imaging apparatus is by no means limited to the digital still camera. That is to say, the imaging apparatus can be generally applied as a camera portion or the like of a digital I/O apparatus such as a digital video camera, a mobile phone having a camera incorporated therein, or a Personal Digital Assistant (PDA) having a camera incorporated therein.

The shapes and numerical values of the portions shown in the embodiments described above are merely an example of concretization for embodying the present disclosure. Thus, the technical scope of the present disclosure should not be intended to be construed in a limiting sense by such shapes and numerical values.

The present disclosure contains subject matter related to that disclosed in Japanese Priority Patent Application JP 2010-185220 filed in the Japan Patent Office on Aug. 20, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens, wherein a first lens group having a negative refractive power, a second lens group having a positive refractive power, and a third lens group having a positive refractive power are disposed from an object side to an image side in order;
    when a zooming state is changed from a wide angle end state to a telescopic end state, at least said first lens group and said second lens group are movable;
    said first lens group is constructed in such a way that a glass lens having a negative refractive power and a plastic lens having a positive refractive power are disposed from the object side to the image side in order;
    said second lens group is constructed in such a way that a cemented lens composed of a glass lens having a positive refractive power and located on the object side, and a glass lens having a negative refractive power and located on the image side, and a plastic lens having a negative refractive power are disposed from the object side to the image side in order;
    said third lens group has at least one plastic lens having a positive refractive power; and
    conditional expressions (1), (2) and (3) are fulfilled:

$$Lw/(fw \cdot \tan \omega w) < 9.0 \qquad (1)$$

$$|f2/(fw \cdot ft)^{1/2}| < 1.0 \qquad (2)$$

$$1.2 < |f1/(fw \cdot ft)^{1/2}| < 1.4 \qquad (3)$$

where Lw is an optical total length in a wide angle end, fw is a focal length of a lens entire system in the wide angle end, $\omega w$ is a half field angle in the wide angle end, f2 is a focal length of said second lens group, ft is a focal length of the lens entire system in a telescopic end, and f1 is a focal length of said first lens group.

2. The zoom lens according to claim 1, wherein conditional expressions (4) and (5) are fulfilled:

$$|fP1/f1| > 2.1 \qquad (4)$$

$$|fP2/f2| > 4.0 \qquad (5)$$

where fP1 is a focal length of said plastic lens having the positive refractive power of said first lens group, and fP2 is a focal length of said plastic lens having the negative refractive power of said second lens group.

3. The zoom lens according to claim 1, wherein a conditional expression (6) is fulfilled:

$$0.9 - Lw/Lt \leq 1.05 \qquad (6)$$

where Lt is an optical total length in a telescopic end.

4. The zoom lens according to claim 1, wherein conditional expression (7) and (8) are fulfilled:

$$1.55 \leq n1 \leq 1.7 \qquad (7)$$

$$v1 > 60 \qquad (8)$$

where n1 is a refractive index of said glass lens having the negative refractive power of said first lens group, and v1 is an Abbe's number of said glass lens having the negative refractive power of said first lens group.

5. An imaging apparatus, comprising:
    a zoom lens; and
    an imaging element converting an optical image formed by said zoom lens into an electrical signal,
    wherein said zoom lens is constructed in such a way that
    a first lens group having a negative refractive power, a second lens group having a positive refractive power, and a third lens group having a positive refractive power are disposed from an object side to an image side in order,
    when a zooming state is changed from a wide angle end state to a telescopic end state, at least said first lens group and said second lens group are movable,
    said first lens group is constructed in such a way that a glass lens having a negative refractive power and a plastic lens having a positive refractive power are disposed from the object side to the image side in order,
    said second lens group is constructed in such a way that a cemented lens composed of a glass lens having a positive refractive power and located on the object side, and a glass lens having a negative refractive power and located on the image side, and a plastic lens having a negative refractive power are disposed from the object side to the image side in order, said third lens group has at least one plastic lens having a positive refractive power, and
conditional expressions (1), (2) and (3) are fulfilled $$Lw/(fw \cdot \tan \omega w) < 9.0 \quad (1)$$

$$|f2/(fw \cdot ft)^{1/2}| < 1.0 \quad (2)$$

$$1.2 < |f1/(fw \cdot ft)^{1/2}| < 1.4 \quad (3)$$

where Lw is an optical total length in a wide angle end, fw is a focal length of a lens entire system in the wide angle end, ωw is a half field angle in the wide angle end, f2 is a focal length of said second lens group, ft is a focal length of the lens entire system in a telescopic end, and f1 is a focal length of said first lens group.

* * * * *